(12) United States Patent
Agarwal et al.

(10) Patent No.: US 12,125,000 B2
(45) Date of Patent: *Oct. 22, 2024

(54) AUTOMATIC DOCUMENT CLASSIFICATION

(71) Applicant: Text IQ, Inc., New York, NY (US)

(72) Inventors: Apoorv Agarwal, New York, NY (US); Ethan Benjamin, New York, NY (US); Jasneet Singh Sabharwal, Vancouver (CA)

(73) Assignee: TEXT IQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,624

(22) Filed: Sep. 29, 2022

(65) Prior Publication Data

US 2023/0038793 A1    Feb. 9, 2023

Related U.S. Application Data

(63) Continuation of application No. 17/357,904, filed on Jun. 24, 2021, now Pat. No. 11,574,287, which is a
(Continued)

(51) Int. Cl.
*G06Q 10/107*   (2023.01)
*G06F 40/284*   (2020.01)
(Continued)

(52) U.S. Cl.
CPC ......... *G06Q 10/107* (2013.01); *G06F 40/284* (2020.01); *G06N 20/00* (2019.01); *H04L 51/212* (2022.05)

(58) Field of Classification Search
CPC ..... H04L 51/212; H04L 51/42; G06Q 10/107; G06F 40/284; G06N 20/00
See application file for complete search history.

(56) References Cited

U.S. PATENT DOCUMENTS

| | | |
|---|---|---|
| 6,078,924 A | 6/2000 | Ainsbury et al. |
| 6,438,543 B1 | 8/2002 | Kazi et al. |
| | (Continued) | |

FOREIGN PATENT DOCUMENTS

| | | |
|---|---|---|
| AU | 2020203735 A1 | 6/2020 |
| CN | 106649223 A | 5/2017 |
| | (Continued) | |

OTHER PUBLICATIONS

Apoorv Agarwal, Adinoyi Omuya, Aaron Harnly, Owen Rambow, A Comprehensive Gold Standard for the Enron Organizational Hierarchy. In Proceedings of the 50th Annual Meeting of the Association for Computational Linguistics (vol. 2: Short Papers), Jul. 2012, pp. 161-165, Korea.
(Continued)

*Primary Examiner* — Shirley X Zhang
(74) *Attorney, Agent, or Firm* — Maschoff Brennan

(57) ABSTRACT

A method to automatically classify emails may include generating multiple entity data objects using entities identified in receiver and sender fields of emails and categorizing the multiple entity data objects into a first set of data objects and a second set of data objects. The method may also include extracting all tokens from each email and searching the extracted tokens for tokens associated with the data objects of the first set of data objects. The method may further include identifying the emails that include the extracted tokens that are associated with the data objects of the first set of data objects, identifying a particular data object of the first set of data objects to which an identified email corresponds, and automatically classifying the identified email in the first category in response to identifying the particular data object of the first set of data objects to which an identified email corresponds.

19 Claims, 16 Drawing Sheets

Related U.S. Application Data continuation of application No. 16/006,511, filed on Jun. 12, 2018, now abandoned.

(60) Provisional application No. 62/570,616, filed on Oct. 10, 2017.

(51) Int. Cl.
    *G06N 20/00*     (2019.01)
    *H04L 51/212*     (2022.01)

(56) References Cited

U.S. PATENT DOCUMENTS

| | | |
|---|---|---|
| 6,694,331 B2 | 2/2004 | Lee |
| 7,275,063 B2 | 9/2007 | Horn |
| 7,585,201 B2 | 9/2009 | Kanai et al. |
| 7,711,573 B1 | 5/2010 | Obeid |
| 8,533,203 B2 | 9/2013 | Chaudhuri et al. |
| 8,832,162 B2 | 9/2014 | Greenspan et al. |
| 9,122,898 B2 | 9/2015 | Coles et al. |
| 9,514,222 B2 | 12/2016 | Toke-Nichols |
| 9,626,424 B2 | 4/2017 | Houghton |
| 10,216,993 B2 | 2/2019 | Jong |
| 10,268,948 B2 | 4/2019 | Warn et al. |
| 10,346,439 B2 | 7/2019 | Agarwal et al. |
| 10,535,003 B2 | 1/2020 | Parker, Jr. et al. |
| 10,558,746 B2 | 2/2020 | Goulikar et al. |
| 10,579,661 B2 | 3/2020 | Drew et al. |
| 11,010,675 B1 | 5/2021 | Sanders et al. |
| 11,080,336 B2 | 8/2021 | Van Dusen |
| 2004/0098339 A1* | 5/2004 | Malek .................. G06Q 30/02 705/44 |
| 2005/0060643 A1 | 3/2005 | Glass et al. |
| 2006/0195461 A1 | 8/2006 | Lo et al. |
| 2008/0215614 A1 | 9/2008 | Slattery |
| 2010/0076972 A1 | 3/2010 | Baron et al. |
| 2010/0161662 A1* | 6/2010 | Jonas .................. G06Q 30/02 707/780 |
| 2011/0258193 A1 | 10/2011 | Brdiczka et al. |
| 2012/0054135 A1 | 3/2012 | Salaka et al. |
| 2013/0036478 A1 | 2/2013 | Davis et al. |
| 2015/0356191 A1 | 12/2015 | Rotem et al. |
| 2015/0363370 A1 | 12/2015 | Tambos |
| 2016/0253679 A1 | 9/2016 | Venkatraman et al. |
| 2016/0259778 A1* | 9/2016 | Cookson ............... G06F 40/284 |
| 2016/0314184 A1* | 10/2016 | Bendersky ............ G06F 16/35 |
| 2017/0213044 A1 | 7/2017 | Olson et al. |
| 2017/0213127 A1 | 7/2017 | Duncan |
| 2017/0214701 A1 | 7/2017 | Hasan |
| 2017/0249553 A1 | 8/2017 | Sellers-Blais |
| 2017/0293595 A1 | 10/2017 | Malleron et al. |
| 2018/0247078 A1 | 8/2018 | Newman |
| 2019/0028509 A1 | 1/2019 | Cidon et al. |
| 2019/0057310 A1 | 2/2019 | Olmstead et al. |
| 2019/0319905 A1* | 10/2019 | Baggett ................ H04L 51/212 |
| 2020/0036666 A1 | 1/2020 | Sathi et al. |
| 2021/0191603 A1 | 6/2021 | Napolitano et al. |
| 2021/0191968 A1 | 6/2021 | Orr et al. |
| 2022/0030009 A1 | 1/2022 | Hasan |

FOREIGN PATENT DOCUMENTS

| | | |
|---|---|---|
| CN | 106649455 B | 5/2017 |
| WO | 1999039286 A1 | 8/1999 |
| WO | 2005116896 A2 | 12/2005 |
| WO | 2006124473 A2 | 11/2006 |
| WO | 2007052285 A2 | 5/2007 |
| WO | 2007062429 A2 | 5/2007 |
| WO | 2007120360 A2 | 10/2007 |
| WO | 2011053309 A1 | 5/2011 |
| WO | 2012115962 A1 | 8/2012 |
| WO | 2012115965 A1 | 8/2012 |
| WO | 2014105867 A1 | 8/2012 |
| WO | 2015009587 A2 | 1/2015 |
| WO | 2017127850 A | 7/2017 |
| WO | 2018057945 A | 3/2018 |
| WO | 2018071054 A1 | 4/2018 |
| WO | 2018116252 A1 | 6/2018 |
| WO | 2019032728 A1 | 2/2019 |

OTHER PUBLICATIONS

Apoorv Agarwal, Sriramkumar Balasubramanian, Anup Kotalwar, Jiehan Zheng, Owen Rambow, Frame Semantic Tree Kernels for Social Network Extraction from Text, Apr. 2014, pp. 211-219,14th Conference of the European Chapter of the Association for Computational Linguistics, Sweden.

Apoorv Agarwal, Daniel Bauer, Owen Rambow, Using Frame Semantics in Natural Language Processing, Jun. 2014, pp. 30-33, Association for Computational Linguistics, Baltimore, MD.

Apoorv Agarwal, Adinoyi Omuya, Jingwei Zhang, Owen Rambow, Enron Corporation: You're the Boss if People Get Mentioned to You, Aug. 2014, Proceedings of The Seventh ASE International Conference on Social Computing, Columbia University.

David M. Blei, Andrew Y. Ng, and Michael I. Jordan, Latent Dinchlet Allocation, 2003, The Journal of Machine Learning Research, pp. 993-1022.

Peter D. Bruza, Dawei W. Song, and Kam-Fai Wong, Aboutness from a Commonsense Perspective, 2000, Journal of the American Society for Information Science, pp. 1090-1105.

Gordon V. Cormack, Maura R. Grossman, Bruce Hedin, Douglas W. Oard, Overview of the TREC 2010 Legal Track, 2010, Proceedings 19th Text Retrieval Conference, p. 1.

Christopher P. Diehl, Lise Getoor, Galileo Namata, Name Reference Resolution in Organizational Email Archives, in SDM, pp. 70-81, Siam.

Tamer Elsayed, Douglas W. Oard, and Galileo Namata, Resolving Personal Names in Email Using Context Expansion, in ACL, pp. 941-949, Citeseer.

Xiaoming Fan, Jianyong Wang, Xu Pu, Lizhu Zhou, and Bing Lv, On Graph-Based Name Disambiguation, Feb. 2011, Journal of Data and Information Quality (JDIQ) pp. 1-23, Philippines.

Manfred Gabriel, Chris Paskach, and David Sharpe, The Challenge and Promise of Predictive Coding for Privilege, 2013, Jun. 2013, Proceedings of The Workshop on Standards for Using Predictive Coding, Machine Learning and Other Advanced Search and Review Methods in E-Discovery, Italy.

Michael Gamon, Tae Yano, Xinying Song, Johnson Apacible, Patrick Pantel, Understanding Document Aboutness Step One: Identifying Salient Entities, Nov. 2013, Microsoft Research Technical Report MSR-TR-2013-73.

Maura R. Grossman and Gordon V. Cormack, Technology-Assisted Review in E-Discovery Can Be More Effective and More Efficient Than Exhaustive Manual Review, 2011, Richmond Journal of Law and Technology, vol. 17, Issue 3, Article 5, pp. 11-16, Richmond.

Birger Hjorland, Towards a Theory of Aboutness, Subject, Topicality, Theme, Domain, Field, Content . . . and Relevance, 2001, Journal of the American Society for Information Science and Technology, 52(9): 774-778, Sweden.

W. John Hutchins, On the Problem of 'Aboutness' in Document Analysis, Apr. 1977, Journal of Informatics, vol. 1, No. 1, pp. 17-35, Norwich.

Utku Irmak, Vadim von Brzeski, Reiner Kraft, Contextual Ranking of Keywords Using Click Data, 2009, ICDE'09, IEEE 25th International Conference, pp. 457-468, Sunnyvale, CA.

Thorsten Joachims, Training Linear SVMs in Linear Time, Proceedings of the 12th ACM SIGKDD International Conference on Knowledge Discovery and Data Mining, pp. 2174-2226, ACM, Ithaca, NY.

Ashish Kapoor, Yuan (Alan) Qi, Hyungil Ahn and Rosalind W. Picard, Hyperparameter and Kernel Learning for Graph Based Semi-Supervised Classification, 2005, in Advances in Neural Information Processing Systems, pp. 627-634.

Masayuki Karasuyama and Hiroshi Mamitsuka, Manifold-based Similarity Adaptation for Label Propagation, Advances in Neural Information Processing Systems, pp. 1547-1555, Japan.

(56) References Cited

OTHER PUBLICATIONS

Brian Karrer and M. E. J. Newman, Stochastic blockmodels and community structure in networks, Aug. 2010, Department of Physics, University of Michigan, Physical Review E, 83(1):016107.

Julian Kupiec, Jan Pedersen and Francine Chen, A Trainable Document Summarizer, Proceedings of the 18th Annual Internation ACM SIGIR Conference on Research and Development in Information Retrieval, pp. 68-73, ACM.

Thomas K. Landauer and Susan T. Dumais, A Solution to Plato's Problem: The Latent Semantic Analysis Theory of Acquisition, Induction, and Representation of Knowledge, 1997, Phychological Review, 104(2):211, Boulder, CO.

Huma Lodhi, Craig Saunders, John Shawe-Taylor, Nello Christianini, and Chris Watkins, Test Classification Using String Kernels, 2002, The Journal of Machine Learning Research, 2:419-444.

Francois Lorrain and Harrison C. White, Structural Equivalence of Individuals in Social Networks, 1971, The Journal of Mathematical Sociology, 1(1):49-80, Harvard.

Miller McPherson, Lynn Smith-Lovin, and James M. Cook, Birds of a Feather: Homophily in Social Networks, 2001, Annual Review of Sociology, pp. 415-444.

Einat Minkov, William W. Cohen, and Andrew Y. Ng, Contextual Search and Name Disambiguation in Email Using Graphs, 2006, Proceedings of the 29th Annual International ACM SIBIR Conference on Research and Development in Information Retrieval, pp. 27-34.

Mark EJ Newman, Detecting Community Structure in Networks, 2004, The European Physical Journal B-Condensed Matter and Complex Systems, 38(2):321-330.

Sam T. Roweis and Lawrence K. Saul, Nonlinear Dimensionality Reduction by Locally Linear Embedding, 2000, 290 (5500):2323-2326.

Gerard Salton, James Allan, and Chris Buckley, Approaches to Passage Retrieval in Full Text Information Systems, 1993, Proceedings of the 16th Annual International ACM SIGIR Conference on Research and Development in Information Retrieval, pp. 49-58, ACM, Ithaca, NY.

Mark Steyvers, Padhraic Smyth, Michal Rosen-Zvi, and Thomas Griths, Probabilistic Author-topic Models for Information Discovery, 2004, Proceedings of the 10th ACM SIGKDD International Conference on Knowledge Discovery and Data Mining, pp. 306-315, ACM.

Fei Wang and Changshui Zhang, 2008, Label Propagation through Linear Neighborhoods, Knowledge and Data Engineering, IEEE Transaction on, 20(1):55-67, China.

Wen-tau Yih, Joshua Goodman, and Bitor R. Carvalho, Finding Advertising Keywords on Web Pages, 2006, Proceedings of the 15th International Conference on World Wide Web, pp. 213-222, ACM.

Xinhua Zhang and Wee S. Lee, Hyperparameter Learning for Graph Based Semi-supervised Learning Algorithms, 2006, Advances in Neural Information Processing Systems, pp. 1585-1592.

Dengyong Zhou, Olivier Bousquet, Thomas Navin Lal, Jason Weston, and Bernhard Scholkopf, 2004, Learning With Local and Global Consistency, Advances in Neural Information Processing Systems, 16(16):321-328, Germany.

X. Zhu, Ghuhramani and J. Lafferty, Semi-supervised Learning Using Gaussian Fields and Harmonic Functions, 2003, ICML, pp. 912-919.

Andrei Z. Broder, Identifying and Filtering Near-Duplicate Documents, 2000, LNCS 1848, pp. 1-10.

Garrido et al., NEREA: Named Entity Recognition and Disambiguation Exploiting Local Document Repositories, Jan. 2017, available at <https://ieeexplore.ieee.org/document/7814719>, 2015.

Stackoverflow, "Can Someone Give an Example of Cosine Similarity, in a Very Simple, Graphical Way?" Oct. 2015, available at <https:stackoverflow.com/questions/1746501/can-someone-give-an-exampler-of-cosine-similiarity-in-a-very-simple-graphical-way>, 2015.

Tokenization, Stanford University Natural Language Processing, [online] published on Apr. 7, 2009, available at <https://nlp.standford.edu/IR-book/html/htmledition/tokenization-1.html>, 2009.

Acemoglu, Daron, and Asu Ozdaglar, Lecture 2: Graph Theory and Social Networks, Sep. 2009.

Gao et al., "Person Entity Linking in EMail With NIL Detection," Journal of the Association for Information Science and Technology, 68(10):2412-2424, First published online Jul. 4, 2017 in Wiley Online Library, available at <https://asistdl.onlinelibrary.wiley.com/doi/full/10.1002/asi.23888.

DigDB, "Sort table by more than three levels in Excel," [online] archived on Jan. 5, 2007 available at <https:web.archive.org/web/20070105221712/http://www.digdb.com/excel_add_ins/sort_mulitiple_levels/>, 2007.

Minkov et al. Extracting Personal Names from Emails: Applying Named Entity Recognition to Informal Text, Association for Computational Linguistics, 2004.

* cited by examiner

Progress Report

Please match the DAY file headers to our mandatory/optional headers (scroll the list)

Selected Mappings (Click on the cross on each to remove):
FROM→FROM ⊗ | EmailSubject→EmailSubject ⊗ | DateSent→DateSent ⊗ | DOCID→DOCID ⊗ | CC→CC ⊗
BCC→BCC ⊗

TIQ Headers
- FROM
- (205)
- TO
- (210)
- Author
- Custodian
- TimeSent

DAT Headers
- ATTACH_DOCID
- Attach
- AttachCount
- Audited Size
- Author
- AuthorComb
- BCC
- BEGINBATES
- BEGINGROUP
- CC Submit The Alignments

215

Steps
- Configure ▾
- Extract Data ▾
- Role Mapping & Entity Parser ▾
- Spammer Annotation ▾
- Domain Prediction ▾
- Domain Annotation ▾
- Normalize Entities ▾

*FIG. 2*

| Is Disclaimer | Current Annotation | Paragraph Id | Paragraph Text |
|---|---|---|---|
| ☐ | Not a disclaimer | N10516266480294177553 | "EDRM Enron Email Data Set has been produced in EML, PST, and NSF format by ZL Technologies, Inc. This Data Set is licensed under a Creative Commons Attribution 3.0 United States License <http://creativecommons.org/licenses/3.0/us/>. To provide attribution, please cite to "ZL Technologies, Inc. (http://www.zlti.com)." |

Search Term: SearchTerm
Min Frequency: 1

155, 156, 157, 158, 159, 160, 161, 162, 163, 164, 165, 166, 167, 168

Save & Return    Confirm Annotations    Save Annotations

FIG. 4

| Steps | Progress Report |
| --- | --- |
| Configure ▾ | Normalization In Progress ... |
| Extract Data ▾ | |
| Role Mapping & Entity Parser ▾ | |
| Spammer Annotation ▾ | |
| Domain Prediction ▾ | |
| Domain Annotation ▾ | |
| Normalize Entities ▾ | |

Done

| EntityId | UIDs | Other Names | ▾ Number Of Embryos |
| --- | --- | --- | --- |
| N5998155714313633907 | brawner;sandra f.brawner@enron.com;brawner sandra f.;sandra.brawner@enron.com;sandra f brawner | sandra f brawner;brawner;brawner sandra f. | 5 |
| P3367873598645434347350 | kam keiser;keiser;kam;kkeiser@enron.com | kam keiser;keiser;kam | 4 |
| N3191353895870050893 | allen phillip k.;phillip k allen;phillip.k.allen@enron.com | allen phillip k.;phillip k allen | 3 |
| N9166286328737706434 | robyn.zivic;imceanotes-robyn+20zivic_na_enron+40ect@enron.com;robyn.zivic@enron.com | robyn zivic | 3 |
| N58670785768792228818 | tim.belden@enron.com;belden tim | belden;belden tim | 3 |
| N7610259096670677278 | chuck;ames;ames chuck | ames;ames chuck;chuck | 3 |
| N36350911763464410320 | patrice;patrice t;mime@enron.com;mims | mims;patrice | 3 |
| N84788035986572515958 | winckowski;michele winckowski;michele.winckowski@enro | winckowski;michele winckowski;winckowski | 3 |

| DOCID | MongoID | Parent Or Family ID | Explore | RecordType | SpamEmails | Email Number | Recipients | TotalRecipients | AvgRecipient |
|---|---|---|---|---|---|---|---|---|---|
| ENG_00056 | N46392808257567788167 | ENG_0000CY | | Email | | | 2 | 2 | 2 |
| ENG_00813 | P76906704817697567799 | ENG_00008Y | | Email | | | 1 | 1 | 1 |
| ENG_01600 | N24474663299847665O | ENG_00016Y | | Email | | | 4 | 4 | 4 |

*FIG. 13A*

| LegalSender | LegalRecipient | AvgPercent | TotalPercent | Attachment | TotalUsers | Total | Category | Reasons |
|---|---|---|---|---|---|---|---|---|
| meyers | | 0 | 0.33333333 | | 19 | 1 | to_from_attorney+self | Attorney with identifier sent email in the email chain |
| | | 0 | | 0 | 13 | 2 | precise_search+self | Reason 1: Personal Name: james derek<br>Reason 2: Attorney james derek email address: james.derek@enron.com was mentioned |
| | | 0 | | 0 | 16 | 1 | mentioned+self | Attorney name in the email address.last@enron.com was mentioned |

AUTOMATIC DOCUMENT CLASSIFICATION

CROSS-REFERENCE TO RELATED APPLICATION

This application is a continuation of U.S. patent application Ser. No. 17/357,904, filed on Jun. 24, 2021, which is a continuation of U.S. patent application Ser. No. 16/006,511, filed Jun. 12, 2018, which claims priority to U.S. Provisional Patent Application No. 62/570,616, filed on Oct. 10, 2017, the disclosures of each of which are hereby incorporated herein by this reference in their entireties.

FIELD

The present disclosure generally relates to automatic document classification.

SUMMARY

A method to automatically classify emails. The method may include training, by a system that includes a processor and memory, a machine learning model configured to distinguishing between first entities having a first shared characteristic and second entities having a second shared characteristic using a curated data set of first entities and second entities, the first shared characteristic being mutually exclusive of the second shared characteristic. The method may also include obtaining, by the system, emails from an email database and generating, by the system, multiple entity data objects using entities identified in receiver and sender fields of the emails, each entity data object of the multiple entity data objects associated with a different entity identified in the emails. The method may further include categorizing, by the system, the multiple entity data objects into a first set of data objects and a second set of data objects using the machine learning model, the first set of data objects associated with a first category for classification of emails. The method may also include extracting, by the system, all tokens from each email, each token being a word or phrase from an email and the tokens including words corresponding to the entities identified in the emails and searching, by the system, the extracted tokens for tokens associated with the data objects of the first set of data objects. The method may further include identifying, by the system, the emails that include the extracted tokens that are associated with the data objects of the first set of data objects and identifying, by the system, a particular data object of the first set of data objects to which an identified email corresponds in response to the identified email including an extracted token that is associated with a multiple data objects of the first set of data objects. In some embodiments, the identifying may include calculating a joint distance for each of the multiple data objects of the first set of data objects, the joint distance for one of the multiple data objects including a sum of minimum graph distances from the one of the multiple data objects to each entity identified in the receiver and sender fields of the identified email and identifying the particular data object in response to the particular data object including a smallest joint distance, the smallest joint distance including the fewest degrees of separation between the particular data object and each entity identified in the receiver and sender fields of the identified email. The method may also include automatically classifying, by the system, the identified email in the first category in response to identifying the particular data object of the first set of data objects to which an identified email corresponds.

BRIEF DESCRIPTION OF THE DRAWINGS

In the following drawings, like reference numbers are used to refer to like elements. Although the following figures depict various examples, the one or more implementations are not limited to the examples depicted in the figures.

FIG. 2 is a screenshot illustrating a mapping of DAT file headers to headers of the exemplary method to review large databases of electronic communications to identify communications that are potentially privileged according to an embodiment.

FIG. 4 is a screenshot illustrating annotation of paragraphs as disclaimers in an exemplary method to review large databases of electronic communications to identify communications that are potentially privileged according to an embodiment.

FIG. 8 shows a screenshot illustrating results of entity normalization in an exemplary method to review large databases of electronic communications to identify communications that are potentially privileged according to an embodiment.

FIG. 10 shows a screenshot illustrating annotation of unclassified entities as legal or a different role in an exemplary method to review large databases of electronic communications to identify communications that are potentially privileged according to an embodiment.

FIGS. 13A-B shows an example report illustrating the results of an exemplary method to review large databases of electronic communications to identify communications that are potentially privileged according to an embodiment.

DETAILED DESCRIPTION

Figure 1:
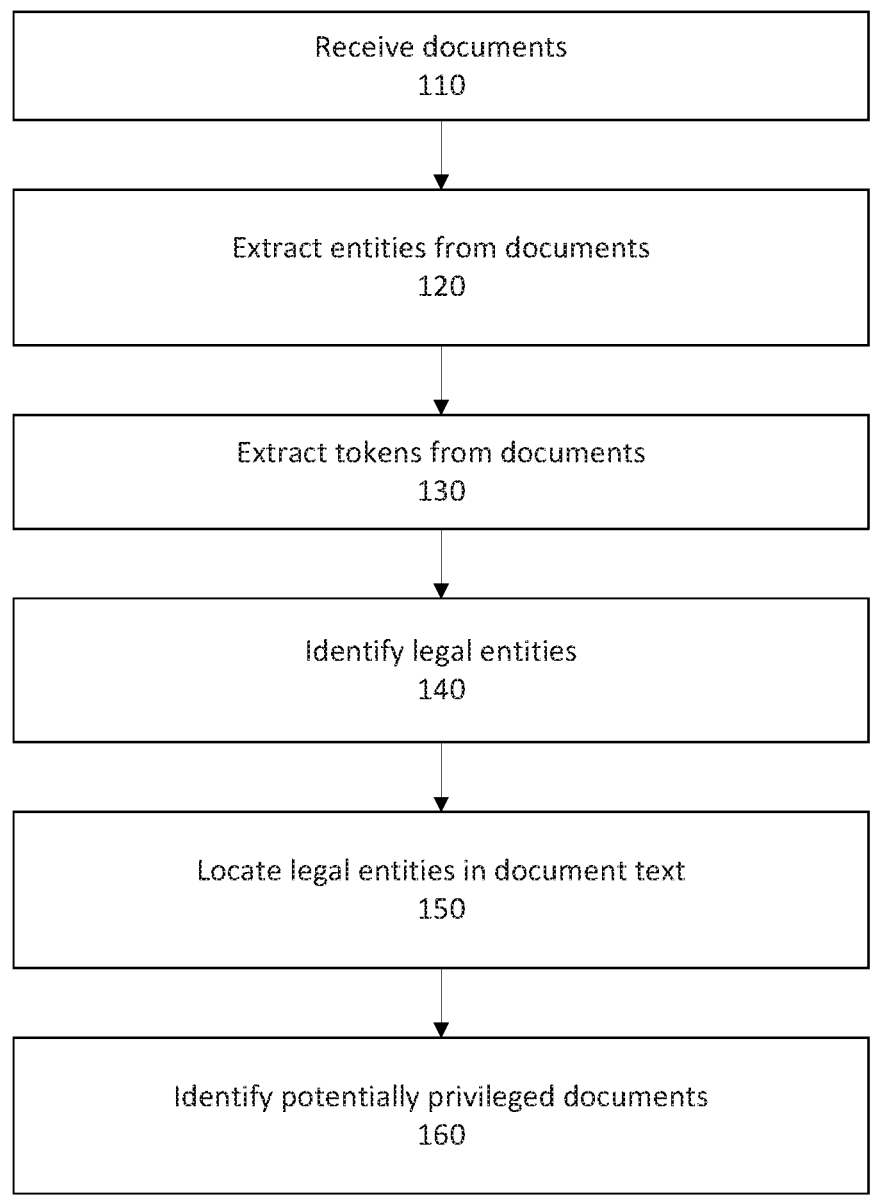
FIG. 1 illustrates an example method for reviewing large databases of electronic communications to identify communications that are potentially privileged, in an embodiment.

The searching of electronic data for evidence in legal proceedings, often referred to as e-discovery, has become a ubiquitous part of litigation proceedings and legal investigations. Various software may be used utilized to manage electronic documents, communications, and the like to facilitate search and classification of the electronic data. One particularly important facet of the e-discovery process is review of the electronic data for information protected by privilege under attorney-client privilege or attorney work product. It is of vital importance for a party submitting its documents to the opposing side that, to the extent possible, all information protected by privilege is not disclosed to the opposing side, as such disclosure may be construed as waiver of the privilege to some or all privileged information within the produced electronic data.

Privileged documents may escape the searching techniques of conventional solutions which only involve searching attorneys of a party. One reason this may occur is that the list of attorneys may be incomplete. This restricts the coverage of the initial searching. Another reason is that employees of the organization may discuss legal advice provided to them by attorneys. While the employees may mention the name of an attorney in the content of the communication, they often do not, for example, copy the attorney on the communication. Since the mentioned attorney is not present in the meta-data fields of the communication, the search may fail to capture these potentially privileged communications.

Privileged information may include not only communications between attorneys and their clients (including employees of the client) regarding legal advice, but also communications between employees of the client discussing the legal advice given to them by the attorney. Attorneys may be both outside counsel and in-house counsel. In organizations, it is common for attorneys to have legal assistants, including paralegals or secretaries, who may convey legal advice on behalf of the attorneys. Even though legal assistants may not be attorneys themselves, their communications may also be considered privileged. Accordingly, there may be many non-attorneys acting on behalf of attorneys who can confer privilege in their communications.

Conventionally, e-discovery is performed by executing searches of the electronic data for topics relating to the litigation or investigation, and perhaps searching for names of attorneys representing a party in the legal proceeding. This process may have several shortcomings. The accuracy of the privilege review may be less than optimal, as keyword and name searches may fail to identify items that use variants of attorney names, items that include legal discussion without naming an attorney, or items where a user simply did not know which keywords or names to search. Consistency of review may also be a problem, as different reviewers may have different opinions as to whether or not a document is privileged or may use searches with varying keywords or names. While quality control may be applied to the results of an e-discovery privilege review, these quality control processes may identify new keywords or names that need to be searched. This may lead to a recursive process that is time-consuming and expensive, as each time unsearched terms are found, a new review of the entirety of the electronic data may be necessary. In order to make privilege review faster and more reliable, several proposed embodiments are described herein.

In a litigation, the e-discovery process commonly requires that both the plaintiff and the defendant collect their data, cull it down using mutually agreed upon search terms (called "responsive review"), and withhold privileged documents (called "privilege review"). To ensure that both parties withhold documents in good faith, the courts require that the parties additionally create and share a privilege log, which specifies the reason that those documents are deemed to be privileged.

Systems and methods are described for processing electronic communications to identify documents that are potentially privileged, such as under attorney-client privilege, attorney work product, or any other legal professional privilege. A processor of a computer having memory may receive documents from a document database. A set of entities may be extracted from the documents, where the entities are associated with one or more of the received documents. Each entity may have an entity name and a role value associated with the entity, where a subset of the set of entities may have legal role values. As part of pre-processing, tokens may be extracted from each document, each token being a word or phrase from a document. The extracted tokens may include one or more entity mentions, where entity mentions include the name of an entity from the set of extracted entities.

In some embodiments, it may be unclear if an entity mention in a document references an entity having a legal role. In an exemplary embodiment, these entity mentions may be resolved by identifying documents from the received documents that include extracted tokens that are entity mentions. For the identified documents, the entity mentions that potentially reference an entity having a legal role value are resolved by comparing a joint difference for every effective candidate entity for the entity mention that potentially references a legal entity. The entity mention may then be associated with the effective candidate entity having the smallest joint difference. The system may then flag the identified documents as potentially privileged when the identified documents include a resolved entity mention associated with one of the subset of legal entities, thereby improving accuracy compared to a conventional approach that merely searches for names of known legal entities.

Other features that improve the accuracy of the improved privilege analysis systems and methods are described herein. For example, a role predictor feature may utilize a privilege list received that includes a plurality of known attorney entities. The plurality of known attorney entities may be a subset of the extracted entities, which may also include a set of unknown role entities. Feature vectors may be determined for each of the entities based on the extracted tokens of the documents associated with each entity. The determined feature vectors of the known attorney entities may be compared with determined feature vectors of each unknown role entity to generate a role prediction for each unknown role entity, the role prediction having a legal value or other/non-legal value. By identifying additional legal entities using role prediction, better accuracy may be attained using the systems and methods described herein. Documents that include a reference to at least one of any known attorney entity and any unknown role entity having a role prediction value of legal may be identified as potentially privileged, based on the number of entity tokens included in the identified documents. Other features may include using a method to extract entities from received documents based on embryo entities using name variant generation and a comparison of the tokens associated with the embryo entities, a disclaimer removal tool that reduces the amount of searching needed, and an iterating process that updates a search when additional name variants are added to an entity.

FIG. 1 illustrates an example method 100 for reviewing large databases of electronic communications to identify communications that are potentially privileged, in an embodiment. A processor of a computer having memory may receive documents from a document database at step 110, such as over a network. To perform the privilege review, some or all of the following data may be received as inputs: (1) a file (e.g. having a DAT format) containing metadata information about the emails and attachments; (2) text files containing extracted texts of emails and attachments; (3) a list of known attorneys along with their email addresses; (4) a list of known law firms; and/or (5) a list of privilege search terms. In an embodiment, at least the metadata file and the text files are received. Information used for parsing the metadata file may also be received. The received information may be used to read the metadata file, and extract information from the metadata file.

Different clients may use different naming conventions for the columns in a metadata file. To process the contents in the metadata file (e.g., metadata in a DAT file format), a user may map the DAT Headers (the column headers in DAT file provided by the client) to the column headers that the privilege analysis system understands. For example: a client might name the DOCID field as Doc Id or they would name the PARENT DOCID field as ParentId. FIG. 2 is a screenshot 200 illustrating a mapping of DAT file headers to privilege review headers of the exemplary method to review large databases of electronic communications to identify communications that are potentially privileged according to an embodiment. The privilege review header rows may be grouped into two categories: mandatory headers 205, which may need to be mapped to a DAT header on the right side, and optional headers 210, which are not required, but should be mapped if the corresponding DAT Header is available.

As a domain name associated with a communication may be indicative as to whether or not the communication includes potentially privileged content. Accordingly, the privilege analysis system may store a list of public domains in some embodiments. If there are any specific public domains that the client would like to add, then the user can upload a file to the privilege analysis system. After uploading, the user will be able to check which domains are properly formatted and which are not. If the system cannot verify the domain's format, the user can click on the domain and update it on the screen. Similarly, the user can upload a list of known law firm domains. These domains may be used to identify potential legal entities in the dataset. Along with the domain, the user may also provide the names of the law firms in the file which will be uploaded. In an exemplary embodiment, the uploaded file should have one law firm and one domain per line, to facilitate parsing of the uploaded list of law firms.

A set of entities may be extracted from the documents, each entity being associated with one or more of the received documents, at step 120. Also, as part of pre-processing, tokens may be extracted from each document, each token being a word or phrase from a document at step 130. Once any initial processing is complete, the privilege analysis system may begin the extraction steps 120 and 130, parsing the emails and attachments that the client has provided. The privilege analysis system may sample a percentage of the data to verify the quality of the data being parsed.

Figure 3:
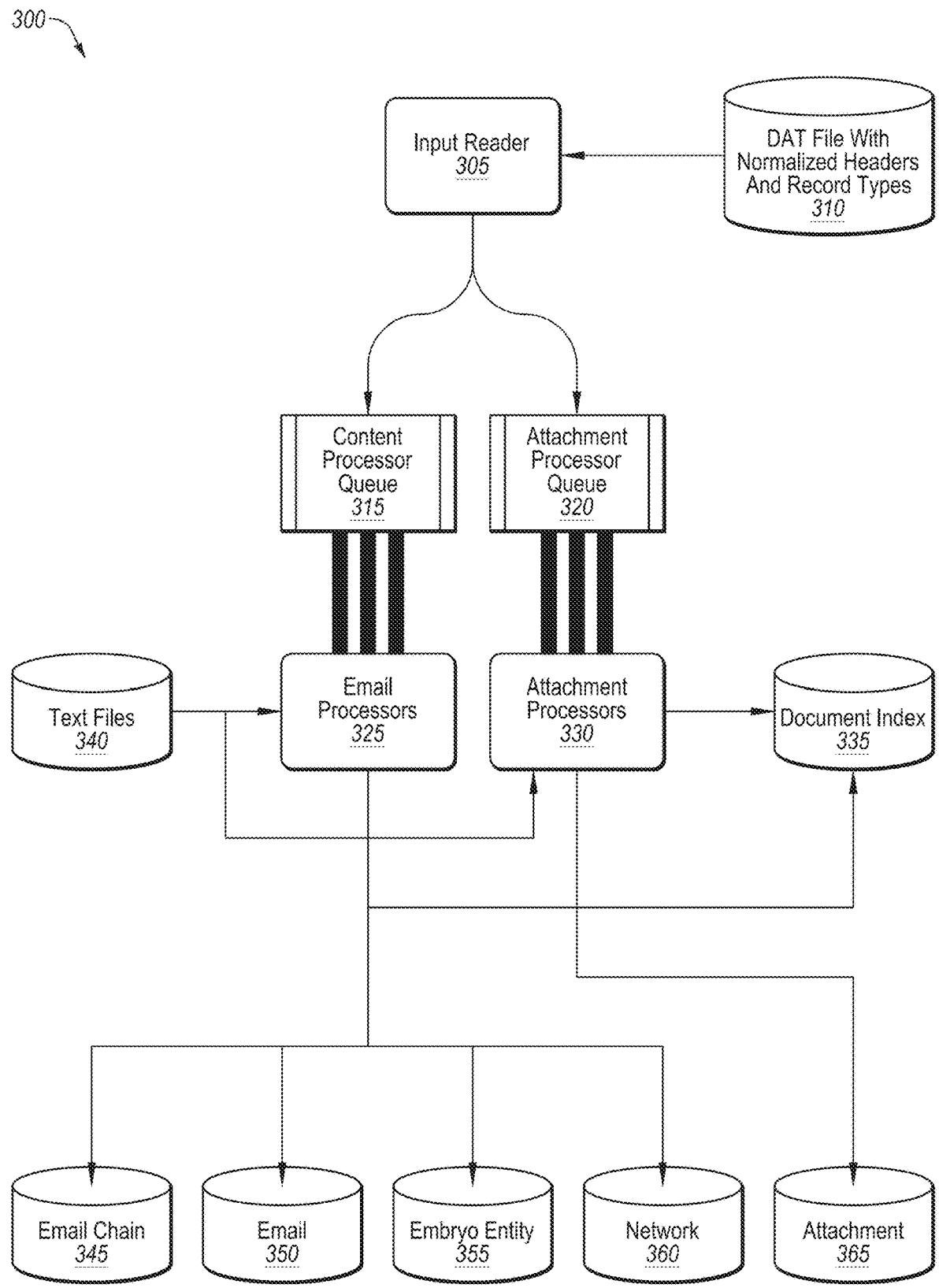
FIG. 3 is a simplified block diagram of an example environment for reviewing large databases of electronic communications to identify communications that are potentially privileged, in an embodiment.

FIG. 3 is a simplified block diagram of an example environment 300 for reviewing large databases of electronic communications to identify communications that are potentially privileged, in an embodiment. FIG. 3 shows a high-level overview of how extraction of the set of entities and the tokens may take place. The environment may include a plurality of modules. The input reader 305 may provide the metadata information to either the Email Processors 325 or Attachment Processors 330. The Email Processor module 325 may read the content of the text files and the metadata information in the DAT to parse the content and populate the privilege review databases. The job of Email Processor 325 may be to identify the people involved in the documents (which are called embryo entities) and the content of the documents. Based on this parsed information, the extractor module may populate the Email Chain 345, Email 350, Embryo Entity 355 and Network collections 360 in the privilege review database. The extractor module may also index the content of emails in Document Content Index 335.

The exemplary environment may also include an attachment processor module. The attachment processor module may read the attachment content based on the metadata information from the DAT record and populate the Attachment collection 365 and Document Content Index 335. The various collections and indexes created during the extraction process may include:

Email Chain: This is a parent data structure of emails. All emails parsed from the same email chain text file are referenced in this data structure.

Email: This contains the metadata information of an email. Sender, recipients (to, bcc and cc), sent date and time, attachments and subject are contained in this data structure.

Embryo Entity: This contains information about a person identified in the data set. It contains the person's email/LDAP address, which emails the person sent, which emails are received, what is the person's first name, last name and middle names, etc.

Network: This is the network of people identified within the dataset. It records who is connected to whom and how are they connected.

Attachment: This collection contains metadata information about attachments.

Document Content Index: This collection contains the text and subject of each email and attachment.

When the extractor module receives an email, the extractor's input reader may forward the record to the email processor. The email processor may fetch all the fields in the email, and the corresponding contents. Based on this information, the email processor will parse the email and produce data objects for any embryo entities associated with the email (e.g. sender and recipient), a network data object containing the sender and recipient, and a document content index for the email. On completion of extractor module, the statistics about the parsed information may be displayed for the user, including the number of records processed, number of embryo entities extracted, number of emails extracted, number attachments extracted, number of DAT lines processed, and the size of the extracted network, for example.

To extract tokens from the received documents, a paragraph extraction module may be used in an exemplary embodiment. This paragraph extraction module iterates over all the documents in the data set. For each document, the paragraph extraction module may split the content into paragraphs using a regular expression. While splitting the content into paragraphs, the paragraph extraction module may also extract character spans for each paragraph. The text of each paragraph may then be cleaned to remove any non-letters and line breaks, tokenized, and if the number of tokens is below a certain threshold, the paragraph may be discarded. The filtered paragraphs are then grouped together based on the cleaned content. A random paragraph from each group may be selected as the leader of the group. In some embodiments, only leaders from each group of paragraphs may be used in further steps to identify disclaimers. Algorithm 1 shows exemplary steps to extract paragraphs from the content.

Algorithm 1
PARAGRAPHEXTRACTION ( )

```
function PARAGRAPHEXTRACTION
    paragraphTextToParagraphs ← An empty mapping of paragraph text to
        the paragraphs
    D ← Set of all documents in the data set.
    for each d ∈ D do          d is a document in the data set
        filteredCharspans ← An empty list.
        Charspans ← Split the content of d using a regular expression to get
            the character spans of each paragraph.
        for each charspan ∈ Charspans do
            cleanedText ← Clean the text to remove any non letters and
                line breaks.
                Replace multiple spaces with single space.
            tokens ← Split cleanedText on white space.
            numTokens ← |tokens|
            If numTokens > threshold then
                Add charspan to filteredCharspans
        for each charspan ∈ filteredCharspans do
            paragraph ← Create a paragraph object from charspan. The
                paragraph object will contain the document id and
                starting and ending spans.
            Add paragraph to paragraphTextToParagraph for the given
                charspan text.
    for each group ∈ paragraphTextToParagraphs do
        leader ← A random paragraph ∈ group
        for each paragraph ∈ group do
            paragraphLeader.ID ← leader.ID
        leader.ChildIds ← Ids of all paragraph ∈ group
    Persist all paragraphs ∈ group to the database.
```

Many of the emails and attachments in a dataset may contain disclaimers. These disclaimers can act like noise within the dataset, as they can slow down the process of annotation and also add noise to search results. To reduce the distortion that disclaimers can cause, in an embodiment a disclaimer removal module may be used to identify the disclaimers that are mentioned within emails and remove them from the text after the extraction steps 120 and 130. In an exemplary embodiment, the disclaimer removal module may be split into multiple tasks, including: (1) building the disclaimer seed set; (2) using the seed set to identify more disclaimers; and (3) removing disclaimers.

To build the disclaimer seed set, a cluster of paragraphs may be identified within the text. One option to identify a small set of disclaimers is to cluster the paragraphs together based on their textual similarity, as a majority of the disclaimers in a data set have similar textual content with minor variations. This clustering approach can group a large number of disclaimers together, which can be used to identify the disclaimers. To cluster paragraphs based on textual similarity, any suitable clustering algorithm may be used. One such example is the Minhash algorithm (A. Z. Broder, "Identifying and filtering near-duplicate documents," in Annual Symposium on Combinatorial Pattern Matching. Springer, 2000, pp. 1-10, hereby incorporated by reference). In contrast to creating regular hashes which have the property to create a unique hash such that the chances of collision are low, minhash creates signatures for a document, such that signatures of similar documents are similar too. To convert the signatures into clusters, a union-find data structure may be used to merge sets that have the same signature. The leader paragraphs identified in paragraph extraction may be clustered together. This step may help to reduce the search space when identifying the seed set of disclaimers.

Once the clustering is complete, the system may present the total number of clusters that have been created (total number of available disjoint paragraph sets), and a user may be able to annotate which clusters are disclaimers and which are not. FIG. 4 is a screenshot 400 illustrating annotation of paragraphs as disclaimers in an exemplary method to review large databases of electronic communications to identify communications that are potentially privileged according to an embodiment. The left panel lists all the clusters with the number of elements in each cluster. The user can also search for specific terms in the search bar above the left panel. This allows the user to quickly find clusters containing common disclaimer words. When the user selects a cluster from the left panel, all the texts belonging to that cluster in the right panel may be shown. If the user sees a piece of text that he would like to mark as a disclaimer, then he can select the checkbox in the right panel.

In an embodiment, the user may perform two types of annotation: precise annotation and approximate annotation. When performing precise annotation, the annotator can select individual disclaimers and mark them as disclaimers. This process may be more accurate and provides the annotator precise control of what disclaimers are selected. However, if there are large number of disclaimer like texts within a cluster, the annotator can use approximate annotation by marking the whole cluster as disclaimer cluster.

In accordance with another embodiment, noisy paragraphs may be removed. The process of removing noisy paragraphs may be divided into multiple steps. First, in an identifying words step, the paragraphs within the clusters marked as disclaimer clusters may be iterated over. From these paragraphs, the frequency of words within these paragraphs may be extracted. Algorithm 2 shows exemplary steps to extract the word frequency, by searching each cluster for a frequency of each token, and storing the number of occurrences in the cluster of each token.

Algorithm 2
ANNOTATIONHELPEREXTRACTOR( )

```
function ANNOTATIONHELPEREXTRACTOR
    wordFrequency ← An empty map which will contain words and
        their frequency.
    C ← Set of clusters annotated as disclaimer containing
    for each cluster ∈ C do
        for each paragraph in cluster do
            for each token in paragraph do
                Increment frequency of word in wordFrequency
    Write wordFrequency to database.
```

Second, in a removing noisy paragraphs step, the words extracted in the previous step which have a frequency below a threshold value are flagged as noise words, since they may indicate that a paragraph is not a disclaimer. If any paragraph in the disclaimer clusters contains one or more noise words, then these paragraphs may be discarded from the disclaimer clusters. Any remaining paragraphs, after removal of all noisy paragraphs is performed, are marked as disclaimers.

According to an embodiment, at the end of the annotation process, a seed set of disclaimers may be identified that can be used in the next section to identify more disclaimers. To perform seed set expansion, a set of bigrams (hereinafter "vocab") may be generated from the list of disclaimers identified in the previous step. After building the vocab set, a set of bigrams may be created for each of the non-disclaimer leader paragraphs. A set coverage may then be calculated between the set of bigrams and vocab which is called the coverage score. The coverage score of each paragraph is saved. Algorithm 3 shows exemplary steps to calculate the coverage score for all non-disclaimer leader paragraphs. The output of Algorithm 3 may be a ratio, for each non-disclaimer leader paragraph, of bigrams found in each non-disclaimer leader paragraph divided by the total number of bigrams in the created vocab set.

---
Algorithm 3
DISCLAIMERCOVERAGECALCULATOR( )
---
function DISCLAIMERCOVERAGECALCULATOR( )
   $paragraph_{disclaimer}$ ← Set of disclaimer leader paragraphs.
   $paragraph_{non-disclaimer}$ ← Set of non-disclaimer leader paragraphs.
   vocab ← ∅
   for each paragraph in $paragraph_{disclaimer}$ do
     cleanedParagraph ← Clean paragraph by removing all non letters.
     bigrams ← Set of bigrams extracted from cleanedParagraph
     Add bigrams to vocab
   for each paragraph in $paragraph_{non-disclaimer}$ do
     cleanedParagraph ← Clean paragraph by removing all non letters.
     bigrams ← Lists of bigrams extracted from cleanedParagraph in order of occurrence in the paragraph text.
     paragraph.score ← CALCULATESETCOVERAGE(bigrams, vocab)
     Update paragraph in database.
---

Algorithm 4 shows an exemplary subsequent process to calculate the set coverage. As seen in Algorithm 4, the extracted "bigrams" set of bigrams from each non-disclaimer lead paragraph may be parsed out into a number of numbered bigram variables (e.g., firstbigram, secondbigram, etc). Each numbered bigram variable is compared to the vocab set of bigrams, and a zero is returned if no numbered bigram variable is present in the vocab set. Finally, the intersection between the vocab set of bigrams and the "bigrams" set of bigrams from each non-disclaimer lead paragraph is determined. The non-disclaimer lead paragraphs are scored based on a ratio of the number of bigrams in the intersection divided by the number of bigrams in the "bigrams" set.

---
Algorithm 4
CALCULATESETCOVERAGE(bigrams, vocab)
---
function CALCULATESETCOVERAGE(bigrams, vocab)
   n ← |bigrams|
   if n < 4 then
     for bigram ∈ bigrams do
       if bigram not ∈ vocab then
         return 0.0
   else
     firstBigram ← bigrams[0]
     secondBigram ← bigrams[1]
     secondLastBigram ← bigrams[n − 2]
     lastBigram ← bigrams[n − 1]
     if firstBigram not ∈ vocab or secondBigram not ∈ vocab or
       secondLastBigram not ∈ vocab or lastBigram not ∈ vocab then
       return 0.0
   commonBirgrams ← bigrams ∩ vocab
   score ← |commonBigrams|/|bigrams|
   return score
---

Once the scores for each non-disclaimer leader paragraphs are calculated, in an embodiment the annotator may be presented a screen displaying all the paragraphs with a score. The user may then start the annotation of paragraphs. The user may be shown paragraphs in the dataset sorted based on how likely they are disclaimers, and he can mark any text as disclaimer. Once satisfied, the user can then remove the disclaimers.

According to one embodiment, using the seed expansion process, the disclaimer removal module may expand the seed set of disclaimers and identify the disclaimer paragraphs present within the text. In the event not all paragraphs are clean, the disclaimer removal algorithm may utilize the disclaimers identified in the previous sections to remove disclaimers within the text of documents. As described in exemplary Algorithm 5, the algorithm first builds a vocabulary of ngrams from known disclaimers.

---
Algorithm 5
DISCLAIMERREMOVAL( )
---
function DISCLAIMERREMOVAL
   D ← All the documents in the data set.
   n ← The ngram size to create.
   vocab ← A set of all n-grams created from disclaimer paragraphs.
   for each document ∈ D do
     cleanedLines ← [ ]
     for each line in document do
       remove, score ← GETCOVERAGESCOREFORLINE(line, vocab, n)
       if remove == false then
         Add line to cleanedLines
       else
         if score < 1.0 then
           cleanedLine ← CLEANLINE(line, vocab, n)
     cleanedContent ← Join cleanedLines on line break
     Update document in database with cleanedContent
---

In an embodiment, the algorithm iterates over all the documents. For each document, it analyzes each line in the text. As described in exemplary Algorithm 6, for each line, it first calculates a coverage score.

---
Algorithm 6
GETCOVERAGESCOREFORLINE(line: THE LINE
TO BE CLEANED, vocab: THE NGRAMS CREATED FROM
DISCLAIMERS, n: THE SIZE OF NGRAM TO CREATE)
---
function GETCOVERAGESCOREFORLINE(line, vocab, n)
   preprocessedLine ← Clean line by removing all non letters.
   numWords ← The number of words in preprocessedLine
   ngrams ← List of ngrams created from preprocessedLine for given n
   if numWords < n then
     return false, 0.0
   commonBigrams ← bigrams ∪ vocab
   score ← |commonBigrams|/|ngrams|
   if score < threshold then
     return false, score
   else
     return true, score
---

If the score is 1.0, the module discards the whole line as it is a disclaimer line. If the score is above a threshold but below 1.0, the module identifies disclaimer text within that line. Algorithm 7 shows an exemplary method to remove disclaimer text from within the line. It does so by first cleaning the line by removing all non-letters. It then creates an alignment between the original line and the cleaned line, as described in exemplary Algorithm 8. Once it has the alignments, the algorithm then creates a list of n-word sequences from the cleaned line. For each sequence, it checks if the sequence is in the earlier built vocabulary. If it is in the vocabulary it then removes those sequences of words, otherwise that sequence is kept.

---
Algorithm 7
CLEANLINE(line: THE LINE TO BE
CLEANED, vocab: THE NGRAMS CREATED FROM DISCLAIMERS,
n: THE SIZE OF NGRAM TO CREATE)
---
function CLEANLINE(line, vocab, n)
   cleanedWords ← [ ]
   preprocessedLine ← Clean line by removing all non letters.
   alignments ← ALIGNTEXT(preprecessedLine, line)
   sequences ← A list of sequences of n words in preprocessedLine -continued Algorithm 7
CLEANLINE(line: THE LINE TO BE
CLEANED, vocab: THE NGRAMS CREATED FROM DISCLAIMERS,
n: THE SIZE OF NGRAM TO CREATE)

```
startIndex ← 0
for each sequence ∈ sequences do
    l ← |sequence|
    if sequence not ∈ vocab then
        includedWords ← alignments[startIndex : startIndex + l]
        startIndex ← startIndex + l
        firstWordStart ← includedWords[0][1]
        lastWordEnd ← includedWords[|includedWords| − 1][2]
        wordsToInclude ← line[lineWordStart : lastWordEnd]
        Add to wordstoInclude to cleanedWords
    else
        startIndex ← startIndex + l
    cleanedLine ← Join cleanedWords on space
    return cleanedLine
```

Algorithm 8
ALIGNTEXT(preprocessedLine: THE
PREPROCESSED LINE, line: THE ORIGINAL LINE)

```
function ALIGNTEXT(preprocessedLine, line)
    alignments ← [ ]
    spanStart ← −1
    spanEnd ← −1
    wordStart ← −1
    charsElapsed ← −1
    n ← |preprocessedLine|
    for i in 1 → n do
        toSearch ← preprocessedLine[i]
        charsElapsed + +
        if toSearch == " " or toSearch == "\n" then
            word ← preprocessedLine[wordState : i]
            Add (word, spanStart, spanEnd + 1) to alignments
            spanStart ← −1
            charsElapsed ← −1
        else
            searchedWordIndex ← line.find(toSearch, spanEnd + 1)
            if spanStart == −1 and searchedWordIndex! = −1 then
                spanStart ← searchedWordIndex
                wordStart ← i
            if searhed WordIndex! = −1 then
                spanEnd ← searchedWordIndex
            subString ← line.substring(spanStart, spanEnd + 1)
            if subString.contains(" ") or substring.contains("\n") then
                i ← i − 1charsElapsed
                spanEnd ← spanStart + 1
                spanStart = −1
                charElapsed ← 0
    if spanStart! = −1 then
        word ← preprocessedLine.substring(wordStart)
        Add (word, spanStart, spanEnd + 1) to alignments
    return alignments
```

The user may then start the process of extracting disclaimers. In accordance with an embodiment, the user would be able to monitor the progress of removing disclaimers. The user would be able to see the total number of emails and attachments left for processing and how many have been processed. Once the process has finished, the privilege analysis system may proceed forward to the role mapping and entity parsing modules.

In an exemplary embodiment, after extraction of embryo entities, the embryo entities may then be parsed to extract information about each person identified in the dataset. When processing the first batch of data, the embryo entity role mapper may be activated, but in subsequent batches it may be disabled if necessary (e.g., until a new list of known attorneys is provided). New embryo entities may be created during the embryo entity role mapper stage.

The embryo entity role mapper may map the initial list of known attorneys provided by the client to the entities identified in the dataset by the extractor. The information provided by each client regarding the known attorneys may be different. But, in many instances the name or email address of the known attorney may be provided. The following is an exemplary list of some of the information that can be utilized: (1) name; (2) email address; (3) title; (4) start date; (5) end date; (6) role (legal or non-legal); and/or (7) nicknames.

Figure 5:
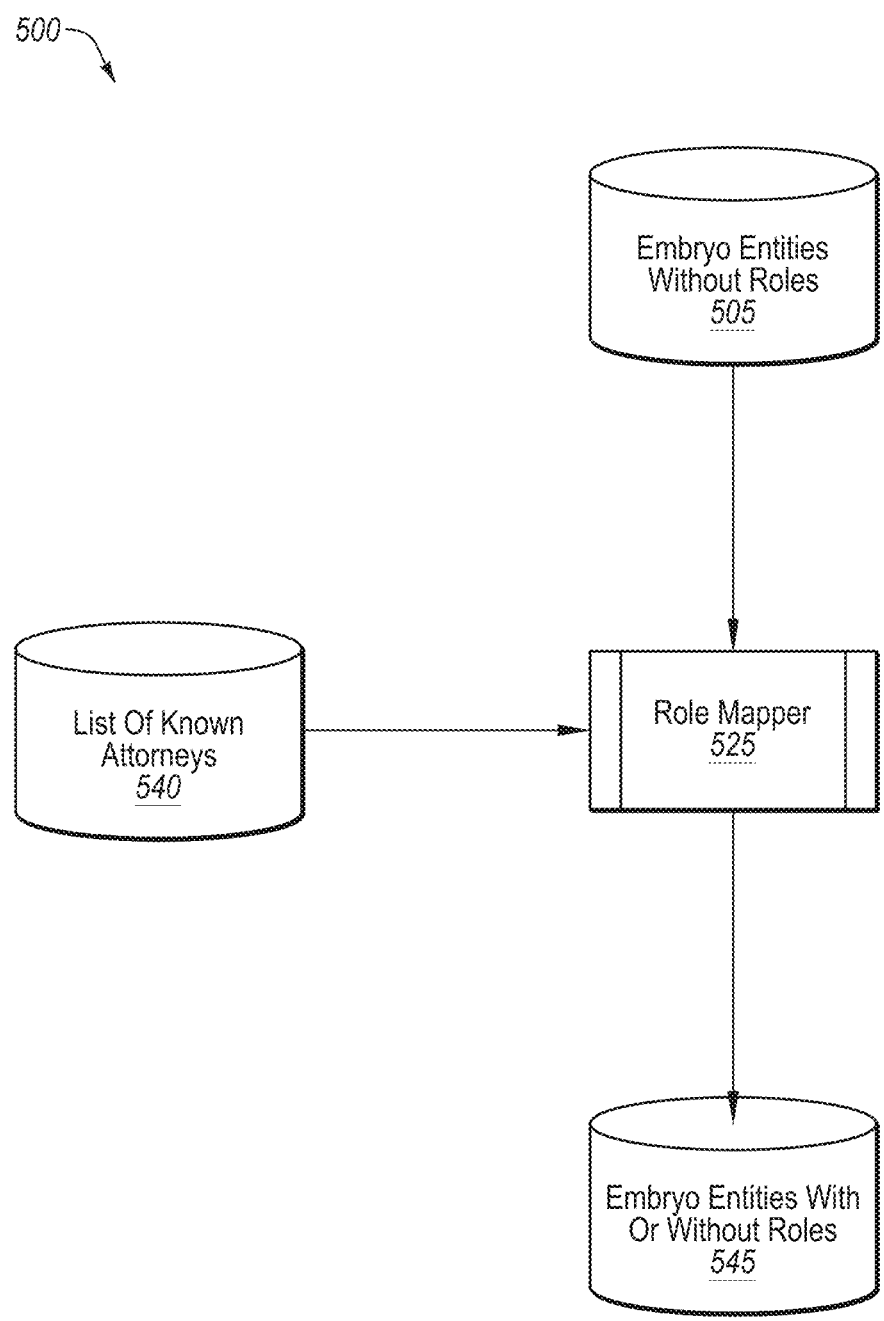
FIG. 5 is a simplified block diagram of an exemplary embryo entity role mapping module, in an embodiment.

FIG. 5 is a simplified block diagram of an embryo entity role mapping module 500, in an exemplary embodiment. In the case when the role mapper cannot map a known attorney to any of the current embryo entities, it may create a new embryo entity object based on the information provided by the client. An entity parser module may then parse the data extracted by extractor and role mapper to fill in the various fields in the embryo entity for the known attorneys. As an example, the entity parser may extract some of the following information for each embryo entity: first name; last name; middle name(s); email; and/or domain.

Based on the extracted domains and any resources received as input, the entity parser may also identify potential legal entities. As an example, the entity parser may receive some of the following resources as inputs before it begins processing: a list of rules that are used to extract information from names and IDs; a list of rules that are used to extract titles from name; a list of law firm domains provided by the client (i.e., "gold law firm domains"); a list of law firm domains already known, which may also contain the gold law firm domains provided by the client (i.e. "all law firm domains").

Before the entity parser begins, the embryo entity objects may have a "uid" field (a unique id which was extracted by the extractor) filled by the extractor. For example, the unique id may be either the email ID of the entity or LDAP ID or name. If the extractor was able to extract any names of the entity then the otherNamesCount field may also be filled with the names extracted along with their occurrence count. For example, Table A is a data object for an embryo entity named John Daniel Doe with email id j.doe@xyz-law.com as the uid. For example, as shown in the Table A, the email address occurred with the names john daniel doe 29 times and doe, john daniel 10 times in the dataset.

TABLE A

Embryo Entity for John Daniel Doe

```
{ "_id" : "P87779540694891838845",
"uid" : "j.doe@xyz-law.com",
"otherNamesCount" : { "john daniel doe" : 29,
"doe, john daniel" : 10},
"firstName" : null, "lastName" : null, "middleNames" :
[ ], "email" : null, "domain" : null, "singleToken" : null,
"m1" : null, "m2" : null, "m3" : null,
"m4" : null, "m5" : null,
"firstNameInitial" : null, "lastNameInitia" : null,
"cannotParse" : false, "trailingNumbers" : null,
"unNormalizedUID" : "j.doe@xyz-law.com",
"unNormalizedNickname" : null,
"realName" : null, "entityRole" : null, "title" : null,
"counselType" : null, "bracketData" : null }
```

According to an embodiment, exemplary steps that may be performed in parsing the embryo entities are shown in exemplary Algorithms 9 and 10.

Algorithm 9
EntityParserAlgorithm(set of embryo entities EmbryoEntites)

Dg ← Set of gold law firms        // Law firm domains provided by client.
Da ← Set of all law firm          // Known law firm domains
domains
for each embryo entity E ∈ EmbryoEntites do
    if E is not parsed then
        Re ← Role of E
        Ep = PARSEENTITY(E)
        Rp = GETROLEOFEMBRYOENTITY(Ep, Re, Dg, Da)
        Set Rp as a role of Ep
        Update E to Ep and mark it as parsed Algorithm 10
PARSEENTITY(embryo entity E)

function PARSEENTITY(E)
    categoriesMap ← A list of pairs containing a regular expression and
        corresponding category name.
    titleRules ← A list of pairs containing regular expression and corres-
        ponding regular expression group.
    uid ← uid of E     // uid is the unique id of an embryo entity extracted
                         by the Extractor module of Priv IQ
    id ← id of E
    name = GETTOPNICKNAME(E)
    Euid = CREATEEMBRYOENTITY(id, iud, categoriesMap, titleRules)
    Ename = CREATEEMBRYOENTITy(id, name, categoriesMap)
    Ep = MERGEEMBRYOENTITIES(Euid, Ename)
    TRANSFERINFORMATIONTONEWEMBRYO(E, Ep) //Update the
        new embryo entity Ep with information from original embryo entity
    E
    return Ep Algorithm 9 receives inputs for parsing embryo entities and calls Algorithm 10. In Algorithm 10, a table of rules called categories map may be loaded. This table contains regular expressions and the corresponding name of the regular expression. These regular expressions may extract information from the name and uid of an embryo entity. As shown in Algorithm 10, a name is identified for the embryo entity (where multiple names or identifiers exist for the embryo entity, the best name is chosen for the name). Exemplary steps to identify the name to use are shown in exemplary Algorithm 11.

Algorithm 11
GETTOPNICKNAME(embryo entity E)

function GETTOPNICKNAME(E)
    uid ← uid of E
    names ← otherNamesCount ∈ E     // otherNamesCount is a map from
        names to count, where each count reflects the number of
        times the Extractor module of Priv IQ extracted a particular
        name for this entity.
    n ← |names|
    if n == 0 then
        return null
    else if n == 1 then
        name ← the only name in names
        if name == uid then
            return null
        return name
    else
        maxCount ← 0
        for each name, count in names do
            if count > maxCount then
                maxCount ← count
        popularNames ← Set of name ∈ names with count == maxCount
        longestName ← emptyString
        for each name in popularNames do
            if |name| > |longestName| then
                longestName ← name
        return longestName Algorithm 11 checks if there are any names in otherNamesCount. If there are none, then it returns a null. If there is only one name in otherNamesCount, then it returns that name. If there are more than one name in otherNamesCount, it returns the name with the highest occurrence count. If multiple names have the same count, which is also the maximum occurrence count in the table, it returns the longest name. For the example shown in Table A, john daniel doe would be used as the name of the entity as it occurred more times than doe, john daniel.

With respect to Algorithm 10, once the name for an entity has been selected, the uid (e.g., j.doe@xyz-law.com) may be parsed to create the embryo entity Euid, and the selected name (john daniel doe) may be parsed to create the embryo entity Ename. Exemplary steps to parse the name and uid to populate various fields for an embryo entity are shown in exemplary Algorithm 12
CREATEEMBRYOENTITY(id, name, categoriesMap)

function CREATEEMBRYOENTITY(id, name, categoriesMap, titleRules)
    modifiedName ← clean name by removing and non ASCII charecters, multiple
        spaces, brackets, and text within those brackets.
    Em ← new EMBRYOENTITY
    Em.id ← id
    Em.uid ← modifiedName
    modifiedName, titles ← EXTRACTTITLES(modifiedName, titleRules)
        Em.titles ← titles
        cannotParse ← True
        for each category, pattern ∈ categoriesMap do
            entityParts ← split category on " "  // The entity parts may contain one or
                more of the following values: first, last, domain, single, middle, email
            if pattern matches modifiedName then
                cannotParse ← False
                n ← |entityParts|
                for i = 0 to n do
                    entityPart ← entityParts[i]
                    groupValue ← matched group i in modifiedName
                    SETFEILDVALUEINEMBRYOENTITY(Em, entityPart, groupValue)
        if Em.domain == null then
            if @ ∈ modifiedName then
                domainParts ← split modifiedName on @
                n ← |domainParts|
                domainContents ← List -continued Algorithm 12
CREATEEMBRYOENTITY(id, name, categoriesMap)

```
    for each i = 1 to n do
        if domainParts[i] ≠ ∅ then
            add domainParts[i] to domainContents
        Em.domain ← Join domainContents on @
    if (Em.firstName == (null or empty)) and (Em.lastName == (null or empty)) and
    (Em.singleToken == (null or empty)) and (Em.middleName == (null or empty))
    then
        cannotParse ← True
    Em.cannotParse ← cannotParse
    realName ← emptyString
    if Em.singleToken ≠ null and Em.singleToken ≠ ∅ then
        realName ← Em.singleToken
    else
        realName ← Em.firstName+ " " +Em.m1+ " " +Em.m2+ " " +Em.m3+ " "
            +Em.m4+ " " +Em.m5+ " " +Em.lastName
    Em.realName ← realName
```

When creating an embryo entity using uid which is j.doe@xyz-law.com or name (john daniel doe), Algorithm 12 may use the regular expressions in "categoriesMap" to identify which expression applies to this email address. The matching regular expression may then be used to extract the various parts in the email address or name, and the values will be set in a new embryo entity object, with identified field values being populated by parts of the uid and/or the selected name. Once the identified field values are set in the embryo entity, the algorithm may then identify the domain, checks if the uid or name has been parsed correctly, and computes the real name. Now that two embryo entities have been created (one from parsing the uid and the other from parsing the popular name), the two embryo entities may be merged to create a final embryo entity. The steps to merge the two embryo entities is shown in exemplary Algorithm 13. As shown in Algorithm 13, field values from the embryo entity formed using the name E., are given priority over the field values from the embryo entity formed using the uid Enid. However, in other embodiments, the Enid values may be prioritized, or a hybrid scheme may be used.

Algorithm 13
MERGEEMBRYOENTITIES(embryo entity
from uid $E_{uid}$, embryo entity from name $E_{name}$)

```
function MERGEEMBRYOENTITIES(E_uid, E_name)
    if name == null then
        return E_uid
    E_m ← new EMBRYOENTITY
    E_m.id ← E_uid.id
    E_m.uid ← E_uid.uid
    E_m.unNormalizedNickname ← E_uid.unNormalizedNickname
        // unNormalizedUID is the original uid that is set by the Extractor as
        compared to the uid that is cleaned in CREATEEMBRYOENTITY.
    Fill firstName, lastName, m1, m2, m3, m4, m5 in E_m.
        // Give priority to the value in E_name. When setting the field values, the rules
        defined in CREATEEMBRYOENTITY should be followed. Also, all the 7
        fields should have unique values.
    Fill email, domain, singleToken in E_m.   // Give priority to the value in E_name.
    E_m.cannotParse ← E_uid.cannotParse && E_name.cannotParse
    E_m.realName ← E_m.firstName+ " " +E_m.m1+ " " +E_m.m2+ " " +E_m.m3+ " " +E_m.m4+
        " " +E_m.m5+ " " +E_m.lastName
```

Once the embryo entities are merged, any remaining data from the original embryo entity may be copied over to the new merged embryo entity. A role may then be assigned to the newly parsed embryo entity. Exemplary Algorithm 14 shows the steps to fetch a role for the new embryo entity.

Algorithm 14
GETROLEOFEMBRYOENTITY(parsed embryo entity Ep, role of original
embryo entity Re, gold law first domains Dg, all law firm domains Da)

```
function GETROLEOFEMBRYOENTITY(Ep, Re, Dg, Da)
    Rp ← null
    if Re == null && Ep.domain ∈ Da then
        if Ep.domain ∈ Dg then
            Rp ← Set role as LEGAL with source as LAW FIRM DOMAIN and status as
                GOLD        // Gold status means that the law firm domain was
```

```
                            Algorithm 14
    GETROLEOFEMBRYOENTITY(parsed embryo entity Ep, role of original
        embryo entity Re, gold law first domains Dg, all law firm domains Da)

provided by the client.
    Rp ← Set role as LEGAL with source as LAW FIRM DOMAIN and status as
        ADDITIONAL          // Additional status means that that law firm domain
        was not provided by the client.
    else
        Rp ← Re
    return Rp
```

Algorithm 14 provides that if the original embryo entity had a role, the same role is returned. If the new embryo entity has a domain which is in gold law firm domains or all law firm domains, a legal role may optionally be returned with the status as either "gold" or "additional" depending if the domain was in gold law firm domains or not. Once the role is assigned to the new embryo entity, the original embryo entity in the database may be replaced with the new embryo entity.

A spammer entity is generally an entity that sends computer generated emails to a large number of people. Such spammer entities can skew the network graph of entities as spammer entities are generally connected to a large number of entities belonging to various cliques. Such connections can create confusions when trying to normalize entities or disambiguate entities (i.e. when identifying the entity given a name). In an embodiment, a spammer detector may identify such entities and remove them from the social network of entities. After the spammer detector is executed, a user may verify the quality of output. The spammer detector may review all the embryo entities identified in the dataset, and store indications that a subset of the embryo entities are potential spammers for review. In a review screen, the user may be provided access to the emails sent and received by the potential spammer. He can then change the role of the entity or delete the spammer annotation if he thinks that the spammer detector was incorrect in a particular case.

Every client's dataset may introduce different domains that are not stored in the known domain databases. The number of unique domains extracted by the extraction module from the dataset may be large enough that it may not be feasible for users to individually go through each domain to identify which ones are for law firms and which ones are not. To help identify law firm domains, some embodiments may include an optional domain predictor to analyze the new domains identified within the dataset. The domain predictor may provide potential law firm domains which can optionally be confirmed by users.

Figure 6:
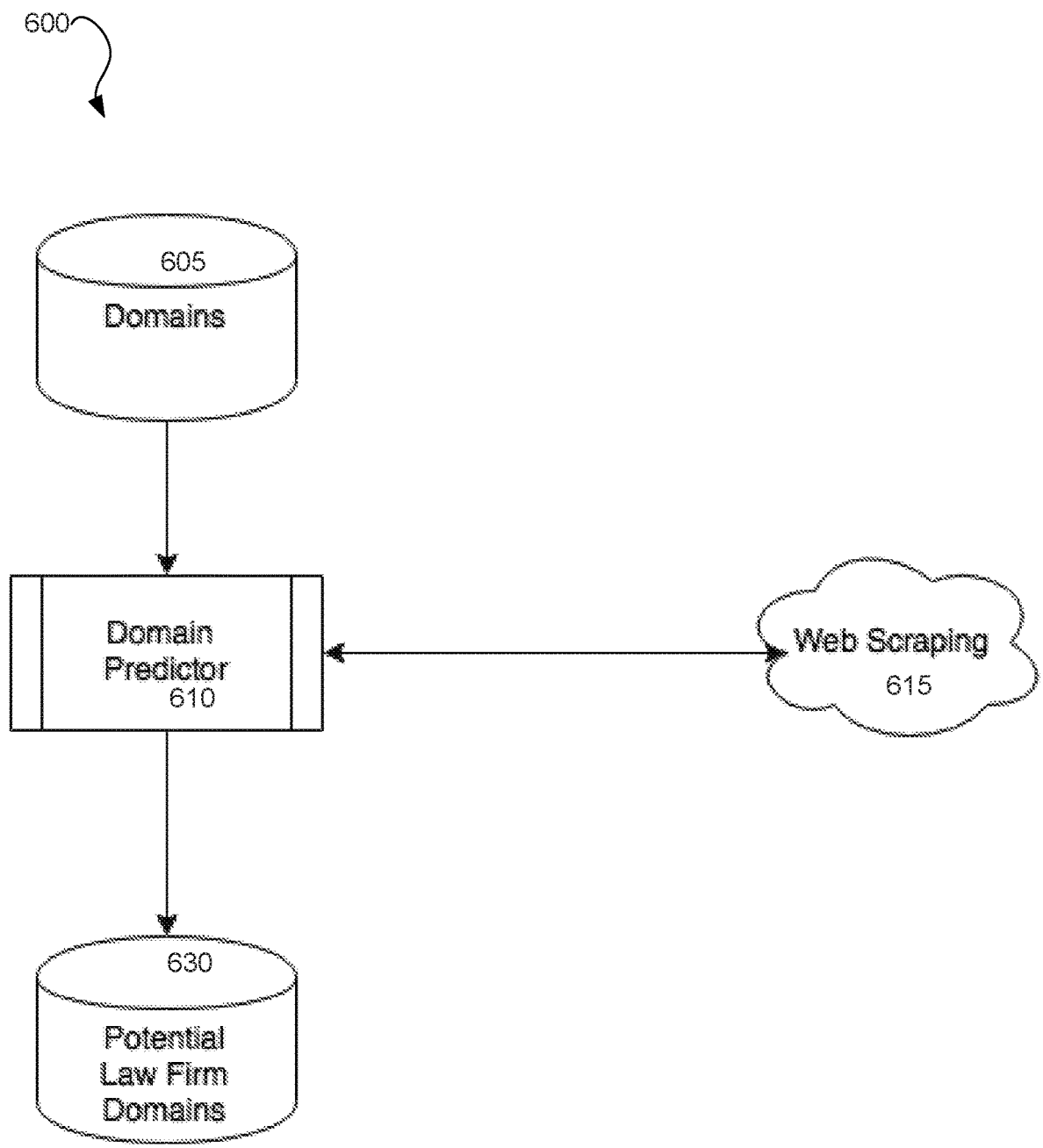
FIG. 6 is a simplified block diagram of an exemplary domain predictor module configured to resolve extracted domains, in an embodiment.

FIG. 6 is a simplified block diagram of an exemplary domain predictor module 600 configured to resolve extracted domains, in an embodiment. As shown, the domain predictor 610 may fetch the contents of all the domains identified within the dataset. The data fetching can be further divided into steps such as: fetching web site content and extracting the firm name. For each identified domain, the content of the home page may be fetched, which may be the raw HTML content displayed on the browser of a user. The name of the firm may be extracted from the content that was fetched for a domain. This extracted firm name may be used in further processing pipelines to identify potentially privileged documents. The HTML content may be parsed using an HTML parser, and each HTML tag and its content is investigated for specific terms. If any of the HTML tags contains the terms being searched, then the tag's content may be added to a list of candidate firm names. Along with this, for each candidate the domain predictor module 600 also maintains the number of times the candidate is extracted. Once all the candidate firm names have been extracted, then each candidate may be compared to the domain for which the content was fetched. A scoring function which considers the longest common substring (between the candidate and domain) and frequency of each candidate, may be used to score each candidate. The candidate which has the highest score may be selected as the name of the firm.

The domain predictor module 610 may then analyze the fetched content to predict whether a domain is potentially a law firm domain or not. Before the content is used by machine learning models, each document may also go through the following steps:
1. Pre-Processing: During this stage, the HTML content may be cleaned to remove noise. All HTML tags from the content may be removed so that only the clean data of the web page is used. Email addresses and URLs may also be normalized.
2. Feature Extraction: During this stage, the pre-processed text may be used to convert text into values that a machine learning algorithm can understand. As an example, two kinds of features may be utilized:
   (a) NGram Features: For each document a vector is created, where the length of the vector is equivalent to the size of a dictionary and the index in the vector corresponds to the position of word in the dictionary. For each word in the document, the number of times it occurs in that document is tracked by the domain predictor module and the frequency value in the vector is set; and
   (b) Term Frequency-Inverse Document Frequency Features: A calculation is made of how important a word is to the document in a collection of documents, using any suitable conventional TF-IDF algorithms.

Once the features have been extracted, domains may be classified using a machine learning algorithm like logistic regression or support vector machine to classify the domains as law firm or non-law firm. To classify the domains, a model trained using a curated data set of law firms and non-law firms may be used to perform the same steps discussed above.

In an embodiment, once domain predictor has finished analyzing all the domains, it may then provide it to the user. The user can modify the name of the law firm and confirm whether or not a flagged domain is a law firm domain. Identified law firm domains may then be stored in database 630 and may be further used by various downstream modules. When the user has finished annotating the domains, he may then annotate a list of domains that match a set of search terms (i.e., high fidelity domains). A list of all the domains in the dataset that are potentially domains of law firms may be displayed to the user, who can then annotate the domain as law firm or public domains.

In another embodiment, after reviewing the potential law firm domains using domain predictor, the remaining domains may be displayed to the user. These domains may be sorted based on the frequency that they occur in the dataset. High frequency domains are analyzed first compared to low frequency domains. When reviewing the domains, the user may classify the domains into one of the three categories: (1) Law Firm: A law firm domain; (2) Public Domain: A domain where anyone can create an account and use it to send emails, such as gmail.com, yahoo.com, etc.; (3) None: If the domain is neither a public domain nor a law firm domain.

In an exemplary embodiment, an entity normalizer may eliminate duplicates in the set of embryo entities. In a corpus a single person can potentially be associated with multiple different identifications. For example, a person named Scott Neal could occur in the email dataset with the following IDs: (1) neal (2) neal, scott (3) scott.neal@enron.com (4) scott neal. Such variations in the dataset could occur due to various reasons. The following are various examples in which the above-mentioned IDs may occur within a dataset:

(1) neal: TO: neal; vickers
(2) neal, scott: TO: Neal Scott; Vickers Frank
(3) scott.neal@enron.com: FROM: Neal Scott <scott.neal@enron.com>
(4) scott neal: TO: scott neal This noise in the dataset can increase the number of entities by a large factor. To resolve these issues, an entity normalizer module may be employed to identify which embryo entities belong to the same person and group them together. The normalizer may assume that a set of embryo entities have been extracted from the received documents. An embryo entity may be a distinct identifier for an email sender or recipient (which can be found in the "FROM"/"TO"/ "CC"/"BCC" section of an email) that has been processed to derive additional information. Each embryo entity may contain a number of name-related attributes. Each of these attributes can have a value of NULL. For example, an identifier "John Jacob Astor Schmidt" that has been parsed into an embryo entity may have some of the following name attribute values:

e.firstName: First name of an entity, like "John"
e.lastName: Last name of an entity, like "Schmidt"
e.m1, e.m2, e.m3, e.m4, e.m5: Attributes for the middle names of an entity. For "John Jacob Astor Schmidt", e.m1="Jacob", e.m2="Astor", and e.m3 . . . e.m5=NULL.
e.firstNameInitial: The first character of e.firstName if it is not NULL, and NULL otherwise.
e.lastNameInitial: The first character of e.lastName if it is not NULL, and NULL otherwise.

Name-related attributes may be distinguished from other embryo entity attributes in that they can be used for producing a name variant for the embryo entity given a name variant rule.

In addition to name-related attributes, embryo entities may have some of the following attributes:

e.id: A unique string identifier for the embryo entity.
e.uid: The best identifier for an embryo entity that could be derived from an email's raw text or other client provided data. Either an email address, an LDAP, or a person's name.
e.domain: The email domain of the embryo entity, such as "enron.com".
e.cannotParse: TRUE if Entity Parser could not parse the entity, FALSE otherwise.

According to an exemplary embodiment, the normalizer may perform an operation DOMAINLESSUIDTOKENS (embryo entity e) which returns the set of tokens of e.uid. The set of tokens can be produced by removing a trailing domain name (if any exists) and splitting on non-alphanumerical characters. For instance, if e.uid is any of "john-.schmidt", "john schmidt", "john-schmidt" or "john.schmidt@gmail.com" then the operation will return {"john", "schmidt"}.

In another embodiment, the entity normalizer may also normalize entities based on an unnormalized email network, a stored set of public and private domains, and/or a domain equivalency set. An unnormalized email network Nu may be represented as a directed graph where V(Nu) is the set of all embryo entities, and (e1, e2) is contained in E(Nu) if the embryo entity e1 sends an email to the embryo entity e2. Each edge (e1, e2) may have an attribute denoting whether e1 has sent emails to e2 in the "TO" list, the 'CC" list, and/or the "BCC" list. Each edge e E E(Nu) has the attribute e.types, a set containing some of the elements {"TO", "CC", "BCC"}.

The entity normalizer may also maintain a set of public domains, which corresponds to email domain names such as "gmail.com" and "yahoo.com" which can be obtained without being an employee of a company. The normalizer may perform the "ISPUBLICDOMAIN" operation to identify public domains, where ISPUBLICDOMAIN(domain d) returns TRUE if d is in a list of known public domains, and FALSE otherwise. A domain d is referred to as a private domain if ISPUBLICDOMAIN(d)=FALSE.

In another exemplary embodiment, a domain equivalency set is a set of private domains used by the same company. Domain equivalency sets may be used to determine if two embryo entities with different private domains are safe to merge. For instance, suppose DE={"enron.com", "it. enron.com"}. If embryo entities e1 and e2 have identical name attributes having e1.domain="enron.com" and e2.domain="it.enron.com", these may refer to the same person. The entity normalizer may maintain a set of known domain equivalency which are not specific to any dataset. Dataset-specific domain equivalencies may be added before running the normalizer. The set of all known domain equivalencies may be referred to as DEall. The sets in DEall are mutually disjoint, meaning that there is no overlap between any two domain equivalency sets. The entity normalizer may perform the following operations with DEall:

AREEQUIVALENTDOMAINS(domain d1, domain d2): TRUE if there is a DE in DEall such that d1 E DE and d2 E DE, FALSE otherwise.
DOMAINEQUIVALENCYFORDOMAIN(domain d): Returns the unique domain equivalency set that contains d if it exists, NULL otherwise.

The entity normalizer may use a name variant rule as a template for producing a potential name variant for an embryo entity. A name variant may be a hypothetical identifier for the actual person corresponding to entity e, which may possibly be observed in a different embryo entity (note: other modules may use the same name variant functionality for different purposes). A name variant rule could be a string that contains placeholders for name-related attributes of an embryo entity. For instance, consider an embryo entity e with: e.firstName="john" and e.lastName="schmidt". The name variant rule $ {firstNameInitial} $ {lastName} may produce the name variant "j schmidt". An exemplary set of name variant rules R that could be used by entity normalizer is listed in Table B. Entity normalizer may perform the following operations for name variant rules:

PRODUCENAMEVARIANT(name variant rule r, embryo entity e): If e lacks any name-related attributes used in the placeholders of r, returns NULL. Otherwise returns the name variant produced by replacing each placeholder of r with the proper attribute of e.

PRODUCEALLNAMEVARIANTS(embryo entity e): If e.cannotParse=TRUE, returns U TOKENS(e.uid) B IGRAMS (e.uid). Otherwise, PRODUCEALLNAME-VARIANTS returns all non-null name variants produced by every rule in R. More formally, PRODUCEALLNAMEVARIANTS returns {PRODUCENAMEVARIANT(r, e):r ERA PRODUCENAMEVARIANT(r, e) #NULL}, resulting in the name variants, for example the name variants shown in Table B.

TABLE B

List of exemplary name variant functions ${firstName}
${lastName}
${firstName} ${lastName}
${firstName}${lastName}
${lastName}${firstName}
${lastName} ${firstName}
${firstNameInitial}${lastName}
${firstNameInitial} ${lastName}
${firstName}${lastNameInitial}
${firstName} ${lastNameInital}
${lastNameInitial}${firstName}
${lastNameInitial} ${firstName}
${lastName}${firstNameInitial}
${lastName} ${firstNameInitial}
${firstName} ${m1}/ ${lastName}
${firstName} ${m1}/ ${m2/${lastName}

In accordance with another embodiment, the entity normalizer may use an avenue may as an intermediary data type. An avenue may represent a partially merged entity which groups together embryo entities that are known to be used by the same person. As the entity normalization proceeds, each avenue will incorporate more and more embryo entities. When normalization finishes, each avenue has grown to its maximum size and is converted to an entity which is persisted to the database. For example, an avenue a may be defined as having some of the following attributes:

a.tokens: The set of all tokens of all name variants of embryo entities merged into a. The tokens of a name variant may be obtained by splitting a name variant on non-alphanumerical characters.

a.embryos: The set all embryo entities merged into a.

a.privateDomainGroup: The domain equivalency set for this avenue, or NULL if no such set exists.

According to an embodiment, entity normalization may group together distinct identifiers (embryo entities) that refer to the same person, and merge embryo entities referring used by the same person into a single data structure (an entity). Entity normalization attempts to avoid "unsafe" merges which combine embryo entities that correspond to different people. As such, the entity normalizer may avoid merges in which: (1) the embryo entities work for different companies (based on their respective email domains); (2) the embryo entities could not all have the same actual name.

In one embodiment of the disclosed subject matter, merging in entity normalization may comprise one or more phases. As an example, entity normalization can be performed in three phases. The first merge phase may group domain-compatible embryo entities which have the same domainless UID tokens. The following rules may be used to determine if two domains (A and B) are compatible:

1. If A is public or NULL, or B is public or NULL, A and B are compatible.

2. If A is private and B is private, and they belong to the same "domain equivalency set", they are compatible.

3. Otherwise, A and B are not compatible.

For example, embryo entities with UIDs of "jim.jacobs@gmail.com", "jacobs jim", and "jim jacobs" may all be merged in this phase. Embryo entities that have only one UID token (such as "jim@gmail.com") may not be merged in some embodiments. This is because merges relying on this limited information may be unsafe (e.g., there can be many "jim"s in one dataset, so it is unsafe to merge "jim@gmail.com" with "jim"). At the end of this phase, each set of merged embryo entities (including single-element sets of embryo entities that were not merged) may be converted into avenues. The set of all avenues produced can then be passed into subsequent stages, which make use of the avenue data structure's name variant token set. Algorithm 15 as an example may be used to execute a version of stage one of the entity normalization merge, executing the steps described above.

---

Algorithm 15
CREATIVEINITALAVENUESFROMUIDS(Set of embryo entities EE)

--- tokenToEntities ← empty map from token strings to sets of embryo entity
ids for e ∈ EE do
    for t ∈ DOMAINLESSUIDTOKENS(e) do
        tokenToEntities(t) ← tokenToEntities(t) U e
parseableEntities ← { e ∈ EE : ¬e.cannotParse}
unparseableEntities ← { e ∈ EE : e.cannotParse}
mergeGraph ← empty undirected graph
for e ∈ parseableEntities do
    tokens ← DOMAINLESSUIDTOKENS(e)
    if |tokens| < 2 then
        continue   //unsafe to merge UIDs with too few tokens
    V (mergeGraph) ← V (mergeGraph) U e
    equivalentEntities ← empty set
    for token ∈ tokens do
        equivalentEntities ← equivalentEntities U tokenToEntities(token)
    for $e^1$ ∈ equivalentEntities do
        if AREDOMAINSCOMPATABLE(e.domain, $e^1$.domain) ∧ e.endNumbers =

Algorithm 15
CREATIVEINITALAVENUESFROMUIDS(Set of embryo entities EE)

```
        e¹ .endNumbers then E(mergeGraph) ← E(mergeGraph) U {(e, e¹)}
for e ∈ unparseableEntities do
    V (mergeGraph) ← V (mergeGraph) U {e}
avenues ← empty set of avenues
for embryoConnComp ∈ FINDCONNECTEDCONPONENTS(mergeGraph) do
    avenues ← avenues U |AVENUEFROMEMBRYOS(embryosConnComp)}
return avenues
```

The second merge phase may be similar to the first, but domain-compatible avenues that have identical name variant tokens are merged as well. Analogous to the previous phase, avenues that have only one name variant token may not be merged in some embodiments. Algorithm 16 shows an exemplary embodiment executing a version of the second merge phase described above.

Algorithm 16
MERGETOKENIDENTICALAVENUES(Set of avenues A)

```
tokensToAvenues ← empty map from sets of tokens to sets of avenues
for a ∈ A do
    tokensToAvenues(a.tokens) ← tokensToAvenues(a.tokens) U {a}
//First pass: merge avenues with identical tokens and compatible domain groups
A ← empty set
for tokens ∈ KEYS(tokensToAvenues) do
    if |token| < 2 then
        A ← A U tokensToAvenues(tokens)
        continue
    avenues ← tokensToAvenues(tokens)
    domToAvenues ← empty map from domain equivalency sets to sets of avenues
    for a ∈ avenues do
        domToAvenues(a.privateDomainGroup)←domToAvenues(a.privateDomainGroup) U {a}
    privateGroups ← {group ∈ KEYS(domToAvenues) : group ≠ NULL}
    if |privateGroups| ≤ 1 ∧ |tokens| then
        A ← A U {MERGEAVENUES(avenues)}
    else
        A ← A U {MERGEAVENUES(domainAvenues) : domainAvenues ∈
            VALUES(domToAvenues)}
```

The third merge phase may involve a hierarchical merge. An avenue ap may contain another avenue a, if the name variant tokens of a, are completely contained within the name variant tokens of ap, so ac.tokens is a subset of ap.tokens. If ap contains a, ap is described as a parent avenue of a, and a, is a child avenue of ap. The set of name variant rules for entity normalizer (see Table B) may be constructed so that if an avenue a, has exactly one parent ap, it is likely that ap and a, refer to the same person. If a, has two or more parents that are not contained within each other, it is possible that a, is the same person as one of these parents, but it may be unclear which parent this is. If a, has exactly one parent, then merging a, into ap is a safe parent-child merge. The hierarchical merge phase performs a sequence of safe parent-child merges that results in fewer final avenues.

In an exemplary embodiment, the set of all avenues with n tokens can be designated the level set of avenues at size n. The hierarchical merge phase iterates through all level sets in descending order of number of tokens. At each level set AL, a mapping may be created from every avenue a in AL to its domain-compatible parents. Additionally, a mapping may be created from every parent of an avenue in AL to all of its children. For each avenue a, in AL, the entity normalizer determines if it has a unique domain-compatible parent ap; if not, the normalizer continues to the next avenue. Otherwise, all children avenues of ap are identified. If the children of ap are mutually domain-compatible, (lc is merged into ap and (lc is removed from A. After iterating through all level sets, A is returned. Algorithm 17 shows an exemplary implementation of a version of the hierarchical merge described above.

Algorithm 17
HIERARCHICALLYMERGEAVENUESFROMTOKENS(Set of avenues A)

```
avenuesByNumTokens ← empty map from integers to sets of avenues
for a ∈ A do
    avenuesByNumToken(|a.tokens|) ← avenuesByNumTokens(|a.tokens|) U {a}
tokenToAvenues ← empty map from strings to sets of avenues
maxNumTokens ← max(KEYS(avenuesByNumTokens))
minNumTokens ← min(KEYS(avenuesByNumTokens))
for numTokens = maxNumTokens down to minNumTokens do
    avenuesAtLevel ← avenuesByNumTokens(numTokens)
```

Algorithm 17
HIERARCHICALLYMERGEAVENUESFROMTOKENS(Set
of avenues A)

```
//for each avenue at this level, find potential parents
avenueToParents ← empty map from avenues to sets of avenues
avenueToChildren ← empty map from avenues to sets of avenues
for childAvenue ∈ avenuesAtLevel do
   //1. Potential parents contain all tokens of child
   parentAvenues ← ∩_t ∈_childAvenue.tokens tokenToAvenue(t)
   //2. Potential parents are domain compatible with child
   parentAvenues ← {p ∈ parentAvenues :
         AREDOMAINGROUPSCOMPATIBLE(childAvenue, p)}
   avenueToParents(childAvenue) ← parentsAvenues
   for parentAvenue ∈ parentAvenues do
      avenueToChildren(parentAvenue) ← avenueToChildren(parentAvenue) U
         {childAvenue}
for avenue ∈ avenuesAtLevel do
   parents ← avenueToPerents(avenue)
   isMerged ← FLASE
   if |parents| = 1 then
      parent ← unique element of parents
      //Ensure that children have compatible domains
      parentChildren ← avenueToChildren(parent)
      if AREDOMAINGROUPSCOMPATIBLE(parentChildren) then
         isMerged ← TRUE
         mergedAvenue ← MERGEAVENUEINPLACE(parent.avenue)
         A ← A \ (avenue)
         A ← A U (mergedAvenue)
   If ¬isMerged then
      for token ∈ avenue.tokens do
         tokenToAvenues(token) ← tokenToAvenues(token) U (avenue)
Return A
```

Figure 7A:
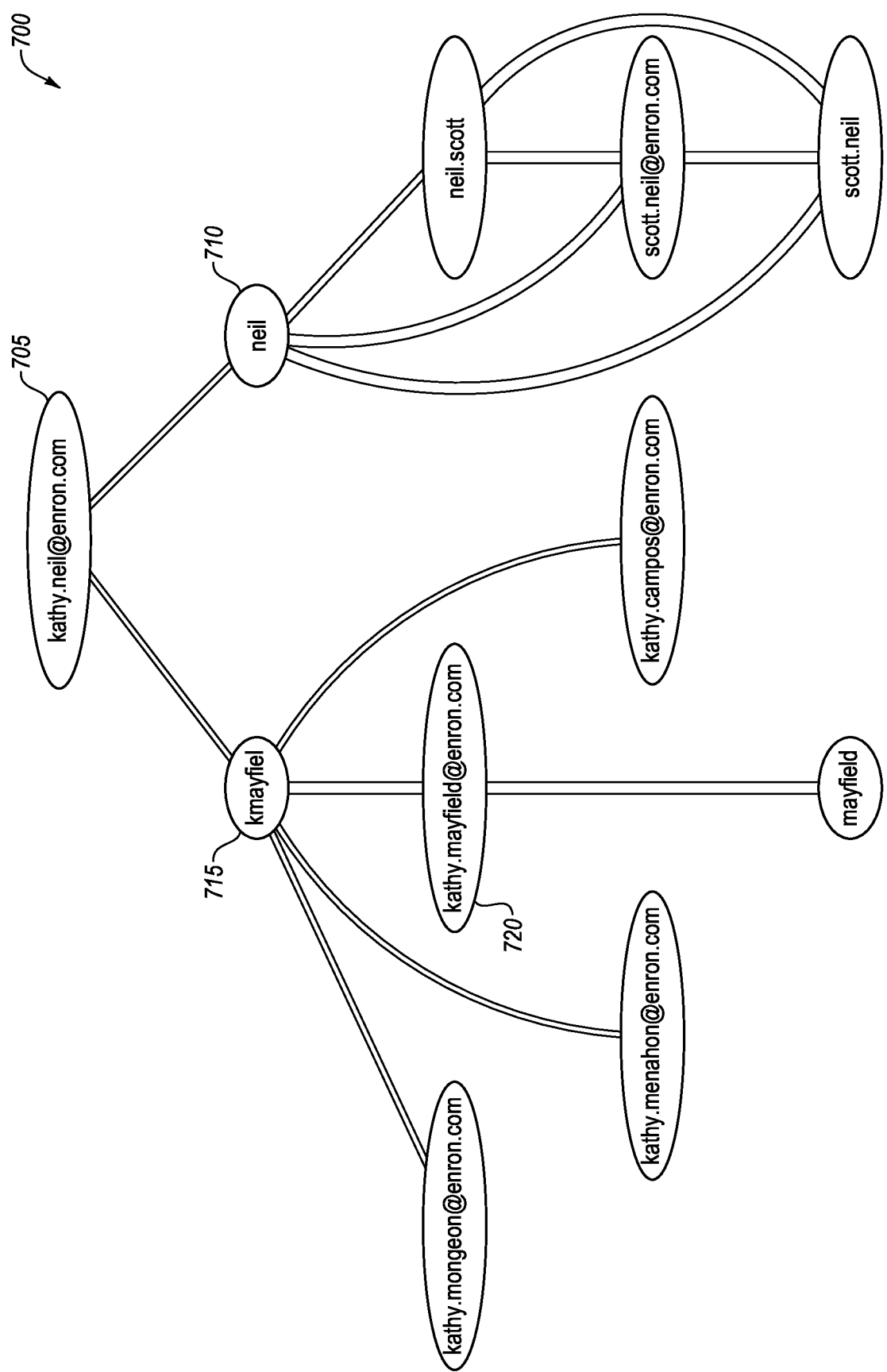
FIGS. 7A-B display exemplary entity graphs before and after entity normalization processing of extracted embryo entities, according to an embodiment.
Figure 7B:
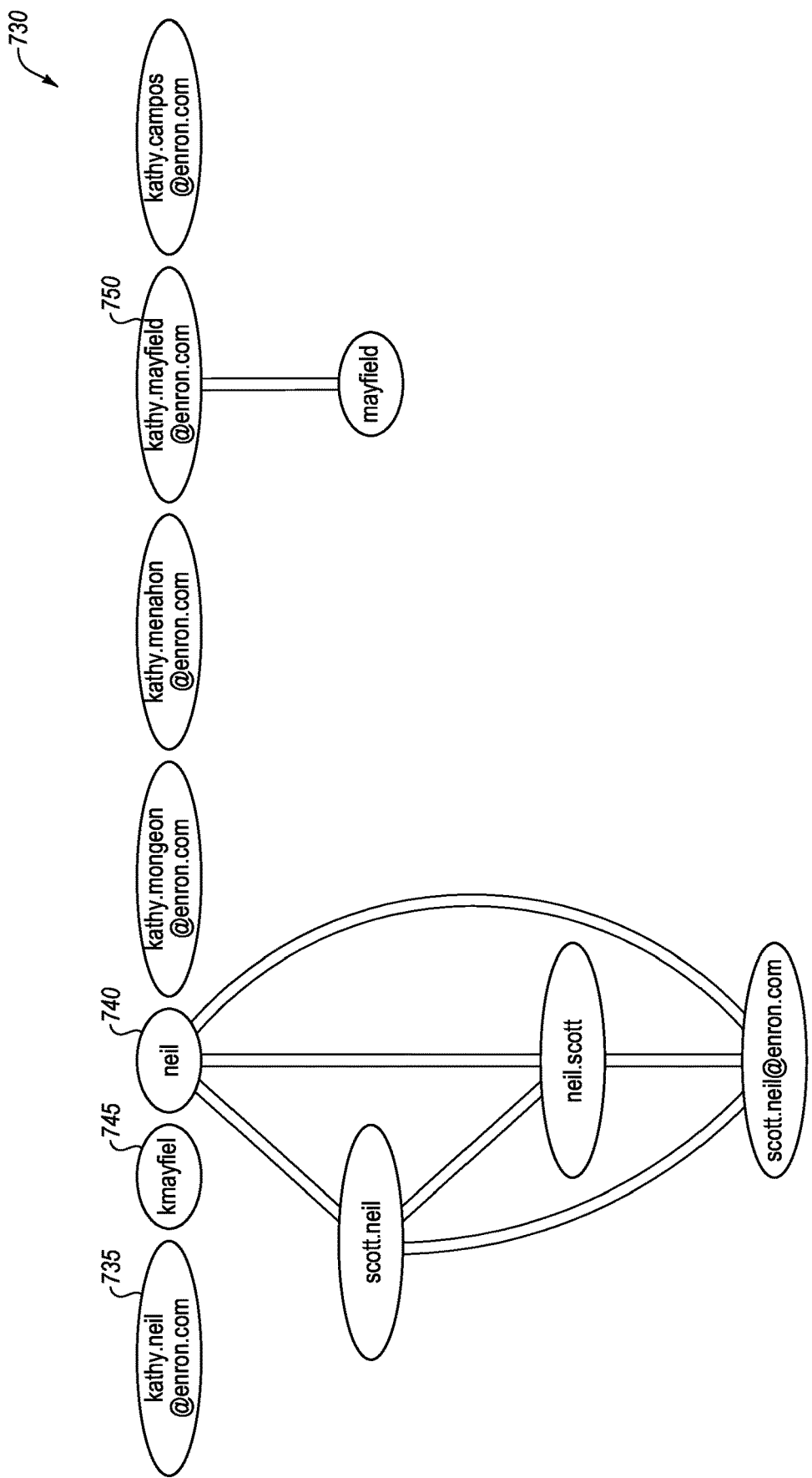

FIGS. 7A-B display exemplary entity graphs before and after an entity normalization processing of 11 extracted embryo entities, according to an embodiment. Each entity E may include one or more embryo entities which the algorithm has determined refer to the same person. It may have the following attributes:

E.id: A unique string identifier for E.

E.eelds: The set of embryo entity IDs for embryo entities contained in E.

The entities may be grouped into a normalized email network NN, which may be the same as an unnormalized email network, except that vertices are entities rather than embryo entities. The embryo entities in graph 700 may be grouped together based on the communication patterns of people occurring in the dataset. The entity normalize module may go through this graph 700 and group the embryo entities together to produce new graph 730. The embryos in each group are grouped together to create new data structures called Entities. Table C shows an exemplary Entity data structure for Scott Neal:

TABLE C exemplary entity data structure for "Scott Neal"

{ "_id" : "N90504716439958469555",
"DTYPE" : "PersonEntity",
"nameVariants" : [
"scott n", "n scott",
"s neal", "neal s",
"nscott", "scottn",
"neals", "sneal"
"scottneal", "nealscott",
"neal", "scott",
"scott neal",
"neal scott" ] }

In an exemplary embodiment, the process of running the entity normalizer can be divided into multiple steps. FIG. 8 shows a screenshot 800 illustrating results of entity normalization. As shown in the screenshot 800, the table may include four columns: EntityId, UIDs (these are the unique IDs of each embryo that were grouped together in that entity, and may comprise email addresses, LDAP IDs, or any other ID detected), Other Names (these are the names with which the people occurred in the dataset), Number of Embryos (the total number of embryo entities that were merged together).

The user may then be able to reduce duplication in the stored domains. The user may be presented with a table that includes of two domains and the similarity between those two domains. The user may mark the domains as equivalent or not, such as to identify if the two domains belong to the same organization or not. Due to noise in the dataset, same domains can have minor spelling mistakes and in this step the user may inform the privilege analysis system that the two domains are the same. For example, the domain yahoo-.com can occur as yahoo.com and yahoo.com due to a human error when sending an email. A similarity score may be provided that represents a confidence that the privilege analysis system thinks the two domains should be equivalent. If the user annotates any domains as equivalent, then the normalizer may be run again, as this annotation would improve the quality of embryos being grouped together.

Figure 9:
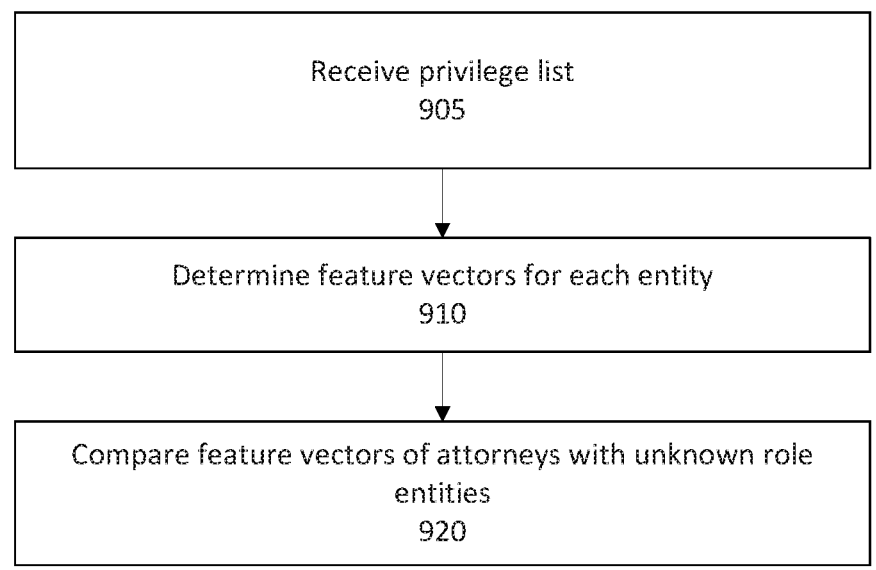
FIG. 9 illustrates an example method for performing role prediction of entities, in an embodiment.

In accordance with an exemplary embodiment, the accuracy of privilege review may be improved by identifying legal entities that were not previously identified. This may be performed using an entity role detector, at step 140 of FIG. 1. FIG. 9 illustrates an example method 900 for performing role prediction of entities. An entity may be assigned a legal role if the entity is an attorney. An entity may also be assigned a legal role if the entity is a non-attorney that is acting in a legal capacity to confer privilege in their communications. As stated previously, a privilege list may be received that includes a plurality of known attorney entities at step 905. The plurality of known attorney entities may be a subset of the extracted entities, which may also include a set of unknown role entities. For a given entity "ent," some of the following attributes may be used:

ent.emailsSent: The set of emails sent by ent.

ent.role: The role of an entity, which can take one of several values (e.g., ent.role=LEGAL, NULL, or a different value).

ent.roleStatus: How the role of an entity was obtained (e.g., ent.roleStatus=PREDICTED, provided by a user, etc.).

Each document (e.g. emails, though other document types may be analyzed) may include raw text and associated metadata. An email may have attributes used by the entity role detector, such as e.sender which indicates the entity which sent the email. Other functions used for emails may include:

FINDPROCESSEDTOKENS(email e): Returns a map T from tokens to counts of tokens in an email. For instance, an email with full content "the reporter went to the reporter meeting and met another reporter" will have T("reporter")=3. Tokens may be obtained, for example, by indexing each email and removing stopwords (i.e., common English words such as "the" that are not semantically meaningful) and purely numerical tokens.

COUNTTOKENS(email e): Returns total count of tokens. Equivalent to summing all map values in FINDPROCESSEDTOKENS(e).

Figure 10:
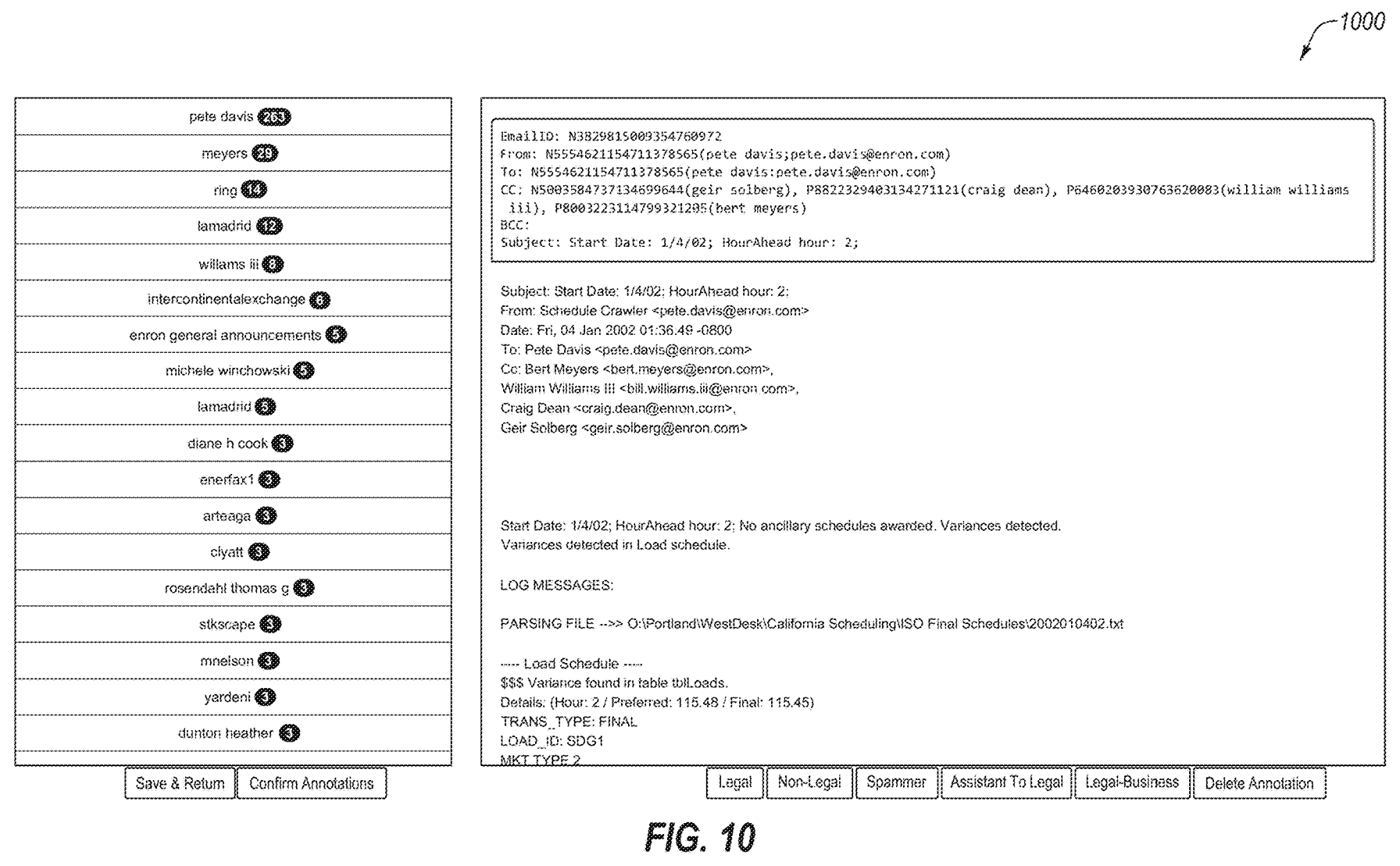

In an embodiment, the set of unknown role entities may be selected by a user prior to running the entity role detector. FIG. 10 shows a screenshot 1000 illustrating annotation of unclassified entities as legal or non-legal roles. This annotation screen lists all the entities in the data set that do not have any role of Legal/Non-Legal/Spammer from the known attorneys list provided by the client or law firm domains (either provided by client, a previously-stored list of known law firm domains, or from domain predictor and annotations). The entities 1005 may be sorted in the descending order of the number of emails that they send. The user can select an entity from the list on the left and entity's emails would then be displayed as shown in frame 1010. The user can then review the emails sent by the entity and assign the entity one of various legal and non-legal roles, such as: (1) Legal; (2) Non-Legal; (3) Spammer; (4) Assistant to Legal (assistant to attorneys and others who may communicate on behalf of attorneys); (5) Legal-Business (an entity who can act in both a legal role and business role). When the user has finished annotating, the roles of entities are changed and can then be used by downstream tasks (including the role detector). This operation allows the user to identify potentially legal or non-legal entities, but this screen also allows the user to give any role to an entity based on the categories. From here, the user can then start the entity role detector module.

Feature vectors may then be determined for each of the entities based on the extracted tokens of the documents associated with each entity at step 910. A feature extractor may be a function that takes a set of entities E and returns a map F from entities to a vector of decimals (also called a "feature vector"). The choice of feature extractor can vary by dataset, and may include the following examples:

LATENTDIRICHLETALLOCATION(set of entities E): Treats all emails sent by a single entity as one "document." The feature vector for each entity is inferred from the document-topic distribution.

WORD2VEC(set of entities E): Runs Word2Vec on the entire email corpus to produce word embeddings for each word. Treats all emails sent by a single entity as one "document." The feature vector for each entity may be the mean word embedding across all tokens for this document.

BAGOFWORDS(set of entities E). Treats all emails sent by a single email as one "document." The feature vector for each entity is the one hot encoding for this document.

In an exemplary embodiment, a trainer may be defined as a function that receives two inputs: a set of feature vectors corresponding to known lawyer entities ("positive examples"), and a set of feature vectors corresponding to known non-lawyer entities ("negative examples"). Given these inputs, the trainer may return a model, which is a function that takes a feature vector and returns a role prediction of either legal or other/non-legal. Logistic regression may be used to classify the feature vectors, and the following functions as examples may also be used in the classification:

TRAINLOGISTICREGRESSION(Set of positive examples P, set of negative examples N): Trains and returns a logistic regression model M.

LOGISTICREGRESSIONPREDICT(Logistic regression model M, feature vector f): Returns either LEGAL or OTHER using a logistic regression model.

At step 920, the determined feature vectors of the known attorney entities may be compared with determined feature vectors of each unknown role entity to generate a role prediction for each unknown role entity, the role prediction having a value of legal or other/non-legal. In an embodiment, the process of running role detector and curating predicted attorneys may be repeated until the privilege analysis system stops predicting any more attorneys. In each cycle, the quality of predictions may improve as the role detector is able to better understand the nuances of the attorneys in the dataset. Pseudocode for the feature extractor and role predictor may be seen below in exemplary Algorithm 18, which executes the above-described steps.

```
Algorithm 18
ROLEDETECTIONALGORITHM(Set of all entities
    E, Feature extractor FEATUREEXTRACTOR )

E ← FINDRELEVANTENTITIES(E)
F ← FEATUREEXTRACTOR(E)
F ← STANDARDIZEDFEATUREVECTORS(F)
positives ← empty act of feature vectors
negatives ← empty set of feature vectors
for e ∈ E do
    if e.roleStatus = PREDICTED V e.roleStatus = NULL then
        continue
    if e.role = LEGAL then
        positives ← positives U {F (e)}
    else
        negatives ← negatives U {F(e)}
model ← TRAINLOGISTICREGRESSION(positives,negatives)
for e ∈ E do
    if e.roleStatus = PREDICTED V e.roleStatus = NULL then
        predictedRole ← LOGISTICREGRESSIONPREDICT(model, F (e))
        e.role ← predictedRole
        e.roleStatus ← PREDICTED
```

According to an embodiment, when the entity role detector finishes running, the user is given options to verify the roles of entities. The roles of entities can be grouped into various legal and non-legal categories, such as: (1) Attorneys—these are the entities predicted as attorney like by the role detector; (2) Non-Attorneys—these are the entities predicted as non-attorney like by the role detector; (3) Input Roles—these are the entities marked as attorney like or non-attorney like depending on the roles of people provided to the role detector; (4) Gold Law Firms—these are the entities which have an attorney like role because of their domain being in the gold law firm domains list provided by the client; and (5) Additional Law Firms—these are the entities which have an attorney like role because of their domain being in the additional law firm domains that were in the known law firm domains list or came from the domain predictor or domain annotation steps. Selecting a category may take the user to a screen similar to screenshot 1000, allowing the user to change the role of individual entities within the category.

In accordance with another embodiment, once the legal entities in the dataset have been identified, an entity mention detector then identifies where the entities are mentioned within the text at step 150. For example, if Sara Shackleton, Mary Cook, Frank Sayre and Brent Hendry are attorneys, the entity mention detector identifies all the mentions of these attorneys within the text. In an embodiment, the entity mention detector may be preceded by an entity name verification step, which is a curation step where the user verifies the names of entities that have a legal role. An interface may be displayed that includes the list of all the entities that have a legal role. The user may select an entity, and all the embryo entities belonging to that entity will be shown. For each embryo entity, the annotator will have the option to fill in multiple fields, such as the following seven fields: (a) First Name; (b) Last Name; (c) M1 (first middle name); (d) M2 (second middle name); (e) M3 (third middle name); (f) M4 (fourth middle name); (g) M5 (fifth middle name). The fields may already be filled with the information extracted from the data set in the entity parser step. Once the user has verified the names for the entity, he may mark the entity as verified in the database. After entity name verification is performed, entity mention detection may be executed.

The entity mention detector may detect the entities with legal roles within the emails in the dataset. In an exemplary embodiment, the entity mention detector not only detects mentions of legal entities when mentioned with their proper first name or full name but may also do so when they are mentioned using their nicknames or other names. For example, for a legal entity with first name Elizabeth it may not only detect mentions of Elizabeth but also when the entity is mentioned with nicknames such as Beth, Liz or Lizzie. To do so, a name variant table may be generated for each entity and accessed by a name entity recognition (NER) module. Each time name entity recognition starts, it either updates the existing table in the database, or creates a new table (e.g., the first time the module is run). Once synchronized with input data (e.g., entities and email), this table determines which name variants need to be searched to produce the requisite mentions. By persistently storing this table, the entity mention detector can determine how to resume work if the system pauses or if there is updated input data (e.g., new entities or entity roles). The name variant table may consist of multiple name variant rows, each with a unique name variant attribute. An exemplary name variant table is shown in Table D below.

TABLE D

| Name Variant Table | | | | |
|---|---|---|---|---|
| NameVariant | Legal | SingleToken | Candidates | ProcessedByNER |
| john jacob schmidt | Y | N | E1, E2 | N |

TABLE D-continued

| Name Variant Table | | | | |
|---|---|---|---|---|
| NameVariant | Legal | SingleToken | Candidates | ProcessedByNER |
| jim scott | N | N | E3, E4, E5 | Y |
| jim astor | N | N | E13, E14, E15 | Y |
| scott | Y | Y | E6, E7, E8, E9, E10 | N |

Each name variant table row may have multiple attributes, including some of the following attributes:
 row.Name Variant: the actual text of the name variant.
 row.Candidates: The set of all embryo entities that have row. Name Variant as a name variant.
 row.Legal: True if any entities e E row.Candidates have e.Role=LEGAL, false otherwise.
 row.SingleToken: False if tokenizing row.NameVariant on non-alphanumerical characters produces many tokens, true otherwise.
 row.ProcessedByNER: True if NER has fully processed this row, false otherwise.

The named entity recognition process may produce a set of mentions for the email corpus. A mention is a piece of text in an email which may refer to a person. Each mention m may have multiple attributes, including some of the following attributes:
 m.LegalCandidates: TRUE if the name variant which generated this mention has legal candidates, FALSE otherwise.
 m.Email: An identifier for the email containing this mention.
 m.Span: The span containing this mention.
 m.IsDummy: TRUE if this mention does not have any candidates within our set of embryo entities, FALSE otherwise.

As stated above, the entity mention detector may identify variants of a known lawyer. For instance, given a lawyer "Jim Jacobsen," the search module may search for "Jim", "Jacobsen", "JJacobsen", and other possible aliases. To avoid errors, name variants that can subsume or intersect with lawyer name variants may also be searched. In an embodiment, if entities for lawyer "Jack Scott" and non-lawyer "Scott Cousins" (which each have the name variant "Scott") are identified, and no other entities with name variant "Scott" exist, then "Scott" is not resolved to the lawyer entity if it appears in the larger text "Scott Cousins."

After synchronizing the name variant table with current entities, it is known which potentially legal name variants are unprocessed. To process such rows, as well as all rows that could subsume or intersect with unprocessed legal mentions, all tokens of unprocessed legal rows may be identified, and then all rows whose name variants contain these tokens may be retrieved. From this set of rows, single-token non-legal name variants, which cannot subsume a legal mention, may be excluded.

In an exemplary embodiment, name variant table rows may be processed in descending order of number of tokens and then by descending order of number of characters. This may ensure that supersets are found before their subsets. For each name variant, all email spans are located which include this name variant. From here, in an embodiment the following outcomes may be reached:

1. If the span does not overlap with prior span, then persist it.
2. If the span is a proper subset of a longer existing span, then discard it.
3. If the span intersects with another existing span, then:
   (a) if both spans are legal (could happen for cases such as Ethan Benjamin (ethan at textiq.com)), discard the shorter span.
   (b) else if both spans are non-legal (could happen for cases such as Ethan Benjamin (ethan at textiq.com)), discard the shorter span.
   (c) if one span is legal and the other is non-legal, persist the legal span and discard the other.

This logic reflects the premise that larger spans may be more trustworthy than smaller spans, and that in cases of ambiguous conflicts, it may in instances be preferable for the entity mention detector to favor finding lawyers.

Only single tokens name variants that are legal may be searched in some embodiments. By definition, a single token cannot intersect with any other mention; it can only be subsumed in another span. If subsumed, the single token name variant may be discarded. Because single-token name variants frequently do not refer to an actual name in text (for example "will" can be either a name or a verb), named entity tagging may be used to determine if a single token span refers to a person. If the name variant is in the English dictionary, the name variant is passed to the named entity tagger as-is. Named entity tagging systems tend to excessively discount rare and foreign names. To offset this effect, if a name variant is not in the English dictionary, the system temporarily assumes that the name variant is a common name (such as "Jim") and passes it to the named entity tagger.

According to an embodiment, based on the prediction of the entity tagger, the following outcomes may be reached for a given span:
1. The span is tagged as a person and is not part of a larger person span: save the span as a mention.
2. The span is tagged as a person but is part of a larger person span: determine if any multi-token name variant is a close misspelling of this span. If so, persist the mention as if it referred to that name variant. Otherwise, a "dummy mention" may be saved, which does not correspond to an entity in the corpus but is used by NDA to avoid resolution mistakes.
3. The systems does not persist the mention.

Figure 11:
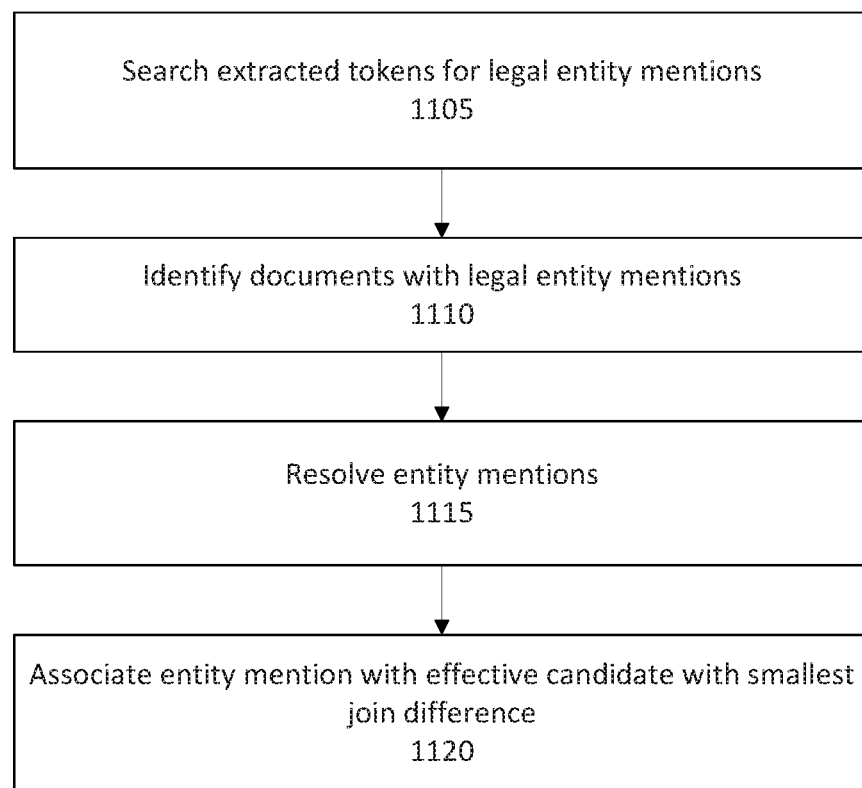
FIG. 11 illustrates an example method for resolving entity mentions, in an embodiment.

FIG. 11 illustrates an example method 1100 for detecting and resolving entity mentions, in an embodiment. At step 1105, the extracted tokens from the documents may be searched for entity mentions of the subset of entities having legal role values. Documents that include extracted tokens that are entity mentions may be identified at step 1110. While the entity mention detector is running it may display statistics like number of mentions identified, total number of emails containing mentions, number of name variants of entities processed, and number of name variants of entities left to process. When the entity mention detector finishes, it will list all the various mentions it detected within the text. Here the user can go through this list and if there are any bad mentions (e.g., a, jr, etc.) then they can ban those mentions from being further used in downstream functions.

Once the entity mention detector has finished identifying all the mentions of legal entities, a name disambiguator (NDA) may map these mentions within emails to the entities in the dataset. For example, the legal entity Mary Cook may have been mentioned in an entity mention token as Mary. The name disambiguator may identify who this Mary is: is she Mary Cook or is she Mary Johnson? The name disambiguator may resolve entity mentions to make sure that the Mary mentioned within that email is mapped to Mary Cook.

In an exemplary embodiment, these entity mentions may be resolved by comparing a joint distance/difference for every effective candidate entity for the entity mention that potentially references a legal entity at step 1115. The joint distance for a candidate entity c in email e may be calculated as the sum of minimum graph distance from c to each email sender/recipients. For example, given a set of sender/recipient entities Re, email network N, and entity c, the joint distance to c for e may be:

$$\sum_{r \in Re} DIST(N, r, c)$$

Wherein DIST is the minimum distance between entities in a network. When choosing a winner among candidate entities for entity disambiguation, the candidate with the smallest joint distance may be selected, as this entity has fewer degrees of separation to the email sender and recipients. The entity mention may then be associated with the effective candidate entity having the smallest joint difference at step 1120.

As part of name disambiguation, emails containing mentions with legal candidates are identified and processed one at a time. For each email e, a mention dependency graph for the mentions may be determined using a MENTIONS(e) function. This mention dependence graph captures the notion that if an email contains multi-token mentions like "Jim Johnson" and "Michael Jim Jacobsen", then a mention "Jim" in the same email should depend on the resolution of the larger mentions.

The name disambiguator may then determine that a multi-token mention mm contains a single-token mention ms if any tokens of mm are equal to the unique token ms, or if any tokens of mm are the formal version of a nickname ms. The latter condition accounts for cases where a person mentioned as "Joe" could be mentioned by a more formal version like "Joseph Jeffries" in the same email. The mention dependency graph is a directed graph in which multi-word mentions have directed edges to single-token mentions which they contain. For instance, in the above example "Jim Johnson" and "Michael Jim Johnson" would have a directed edge to "Jim." "Jim Johnson" would be a parent of "Jim". In the dependency graph, only vertices which are either potentially legal mentions or parents of potentially legal mentions may be retained.

The name disambiguator may then process each mention in the mention dependency graph in topological sorted order. This order ensures that no mention is processed before any parents it depends on. For each mention m, if a mention has exactly one non-dummy parent mp, m is resolved in the same manner as mp. If a mention has one or more dummy parents, then m is marked as unresolvable, and its dummy parents are flagged. Otherwise, the mention cannot be resolved solely from its parents. The intrinsic candidates of a mention m may be defined as the set of candidates CANDIDATES(m) produced by named entity recognition. If m has multiple non-dummy parents, then its effective candidates are the intrinsic candidates of all its parents. Otherwise, the effective candidates of m are the same as its intrinsic candidates.

The joint distance may be determined for every intrinsic candidate of every mention in the mention dependency graph. This only needs to be done once per email. If m has no effective candidates, m is marked as unresolvable. If m has exactly one effective candidate, or one effective candidate with strictly smaller joint distance than other candidates, m may be resolved to that that single candidate. If the name disambiguator has not yet made a decision for m, then m may have multiple effective candidates which are tied in joint distance. A volume-based tie breaker may be used to pick a winner among these tied candidates. For example, for a candidate entity c, a volume may be determined as the total number of emails it sent to (or received from) the email sender and recipients. If one of the tied candidates has a strictly higher volume than the rest, that candidate is selected as the winner. Otherwise, mention m is marked as unresolvable. Algorithm 19 presents the pseudocode for an exemplary name disambiguation algorithm as described above. Algorithm 19 NAMEDISAMBIGUATION(set of emails E, email network N)

Algorithm 19
NAMEISAMBIGUATION(set of emails E, email network N )

```
E_L ← {e ∈ E : ∃_m ∈ Mentions(e) s.t. HASLEGALCANDIDATES(m)}
for each email c ∈ E_L do
    if SHOULDNOTRESOLVE(e) then
        // Mark each mention m ∈ MENTIONS(e) as unresolved
        continue
    M_e ← MENTIONS(e)
    D_e ← MENTIONDEPENDANCYGRAPH(M_e)) //Legal mentions and mentions they
                depend on
    C_e ← Um∈_v(De) CANDIDATES(m)
    R_e ← {SENDER(e)} URECEIPTS(e)
    Dists_e ← COMPUTEJOINTDISTANCES(R_e, C_e, N)
    M_topo ← TOPOLOGICALSORT(D_e) //Ensure dependencies of a mention are resolved
                before the mention
    for each m in M_topo do
        //From supersets, determine winners W_m or calculate effective candidates C_m
        Define PARENTS(m, D_e) = {mp : (m_p, m) ∈ E(D_e)}
        Define NONDUMMYPARENTS(m, D_e) = {mp : (m_p, m) ∈ E(D_e) AND
                ¬ ISDUMMY(m_p)}
        if ¬ HASLEGALCANDIDATES(m) OR PARENTS (m, D_e) = Ø then
            C_m ← CANDIDATES(m)
        else if |NONDUMMYPARENTS(m, D_e)|= 1 then
            m_p ← the unique non-dummy parent of m
            W_m ← Wm_p // resolved if the parent could be uniquely resolved.
                unresolved if the parent could not be uniquely resolved.
            continue
        else if |NONDUMMYPARENTS(m, D_e)| > 1 then
            Cm ← Um_p ∈ NONDUMMYPARENTS(m,D_e) CANDIDATES(m_p)
        else
            //There must be at least one dummy parent. resolve to dummy text, not an
                actual entity.
            W_m ← DUMMYPARENTS(m, D_e)
            continue
        //Calculate winners W_m from candidates C_m
        if C_m = Ø then
            //Mention cannot be resolved: no potential candidates found
            continue
        else if |C_m| == 1 then
            //Mention uniquely resolved to the only candidate in C_m
        else
            W_m = arg min_c ∈_Cm Dists_e(c)
            if W_m = □ then
                //Mention cannot be resolved: joint distance of candidates is infinite
                continue
            else if |W_m| = 1 then
                //Resolve to unique element of W_m
            else
                W_m = VOLUMETIEBREAKER(R_e, W_m, N )
                if |W_m| > 1 then
                    //Mention cannot be resolved: too many candidates at the same
                        joint distance
                else
                    //Resolve to unique element on W_m
```

Figure 12A:
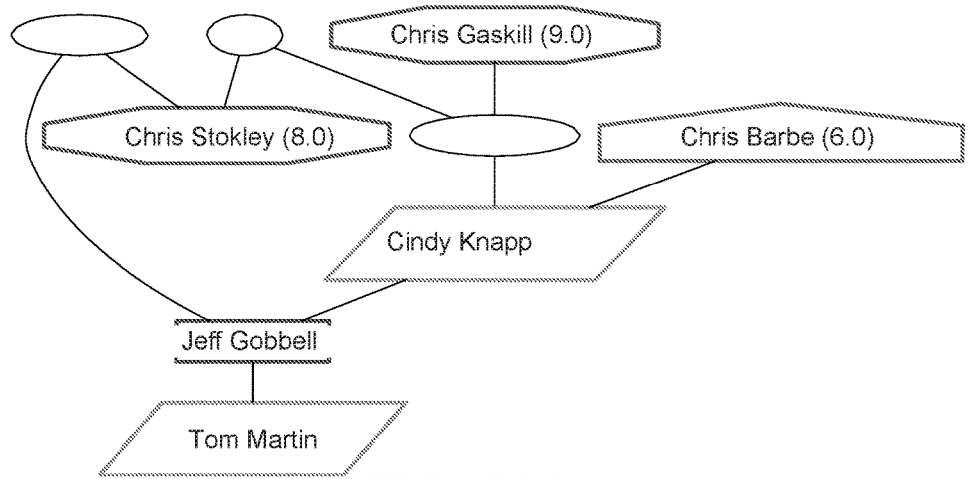
FIGS. 12A-B show graphs depicting exemplary resolutions of entity mentions using join distance, according to an embodiment.
Figure 12B:
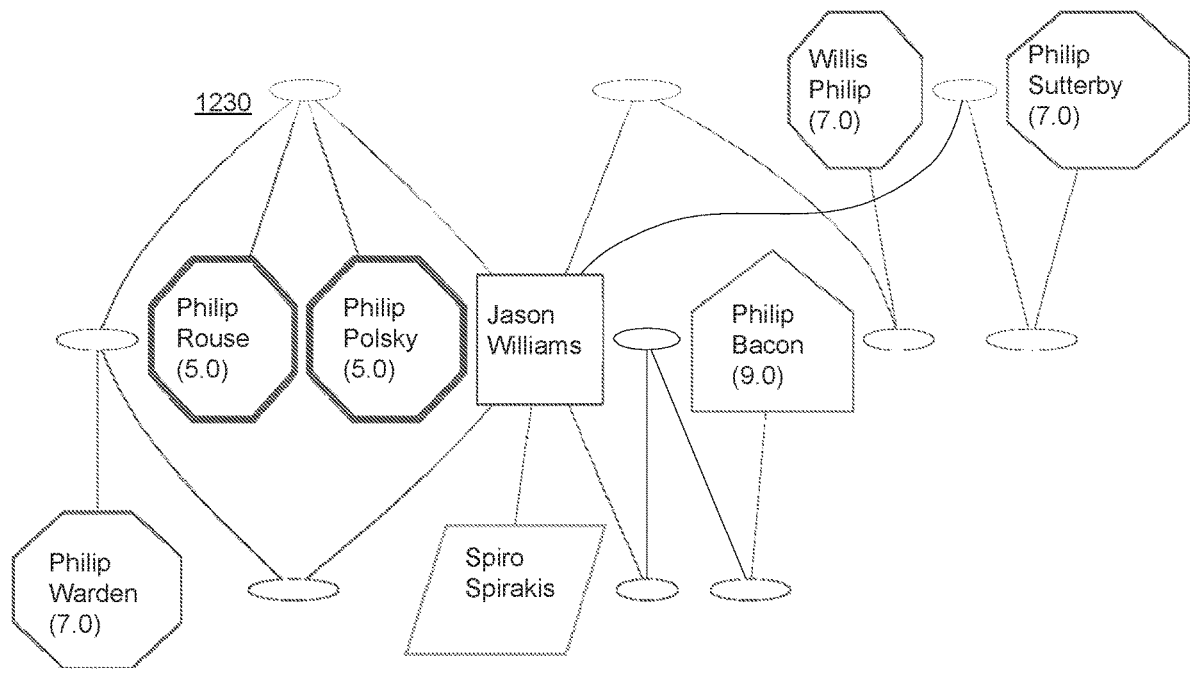

FIGS. 12A-B show graphs 1200 and 1250 depicting exemplary resolutions of entity mentions using joint distance, according to an embodiment. FIG. 1200 shows the shortest paths of the top three candidates for the mention Chris from the sender, Jeff Gobbell, and the recipients, Tom Martin and Cindy Knapp. The three candidates are Chris Barbe, Chris Stokley, and Chris Gaskill. The length of the shortest path from the sender Jeff Gobbell to Chris Barbe is 2 (Jeff Gobbell→Cindy Knapp→Chris Barbe). The length of the shortest path from Cindy Knapp to Chris Barbe is 1, and the length of the shortest path from Tom Martin to Chris Barbe is 3. Therefore, the joint distance of Chris Barbe from the sender and the recipients is 6 (2+1+3). The other two candidates are at a greater joint distance; Chris Stokley is at a joint distance of 8 and Chris Gaskill is at a joint distance of 9. Therefore, the name disambiguation algorithm predicts Chris Barbe to be the winning candidate, which is the correct prediction.

FIG. 12B shows an example in which a prediction is not made because there are two winning candidates at the same joint distance from the sender (Jason Williams) and the recipient (Spiro Spirakis). This is a hard example; the correct candidate is much further away from the sender and the recipient. The correct candidate is at a joint distance of 9. There are five other Philips at a shorter joint distance from the sender and the recipient.

As discussed above, the disclosed subject matter may identify all legal entities in the dataset, and identify mentions of legal entities within emails in the dataset. To cover any remaining edge cases of potentially privileged documents, an exemplary embodiment may perform searching may perform for various keywords within the emails and attachments. The types of keywords that are used can be grouped into categories: for example, precise search and imprecise search.

Precise search may comprise several approaches to keyword searching such as the exemplary categories. First, law firm domains: this may include the domains of law firms that have been identified within the dataset and/or all the previously known law firm domains. Second, law firm names: this may include the full names of all the law firms that have been identified within the dataset and also all the previously known law firms. Third, lawyer names: this may include the names of all the legal entities that have been identified. The following types of legal entity names may be used: (i) the full name of the legal entity, (ii) the address or LDAP ID or name which was identified by the extractor, and/or (iii) name variants of the legal entity. Imprecise search may also comprise several approaches to searching such as the following two exemplary categories. First, custom search terms: this may include any keywords which might be used based on the specifics of the case or which might come up during the quality checks. Second, law firm name variants: this may include variations of the law firms that have been identified within the dataset and also law firms in the known law firms list.

For each of the above-mentioned categories, the disclosed subject matter has the functionality available to search in various locations, including the following locations. First, content: which includes the content of emails and attachments. Second, subject: which includes the subject lines of the emails. Third, DAT file: which includes the DAT file provided by the client. When running search, one of the above-mentioned search locations may be selected for each category. The user may also have the additional functionality to upload search keywords in each of the categories by uploading a file.

In an embodiment, once search has completed, an email classifier module may be used to identify potentially privileged documents. Returning to FIG. 1, at step 160, potentially privileged documents may be identified using the identified entities and entity mentions. The email classifier module may use the information gathered to identify potentially privileged documents in the dataset. For example, the email classifier may use one or more of the following data to identify potentially privileged documents: (1) legal entities; (2) mentions of legal entities; and (3) the search results. After the search for potentially privileged documents is complete, a report may be generated to gather all the information that has been generated and to create a report which can then be imported into a document review platform. FIGS. 13A-B show a screenshot 1300 illustrating an example report illustrating the results of the email classifier search.

Figure 14:
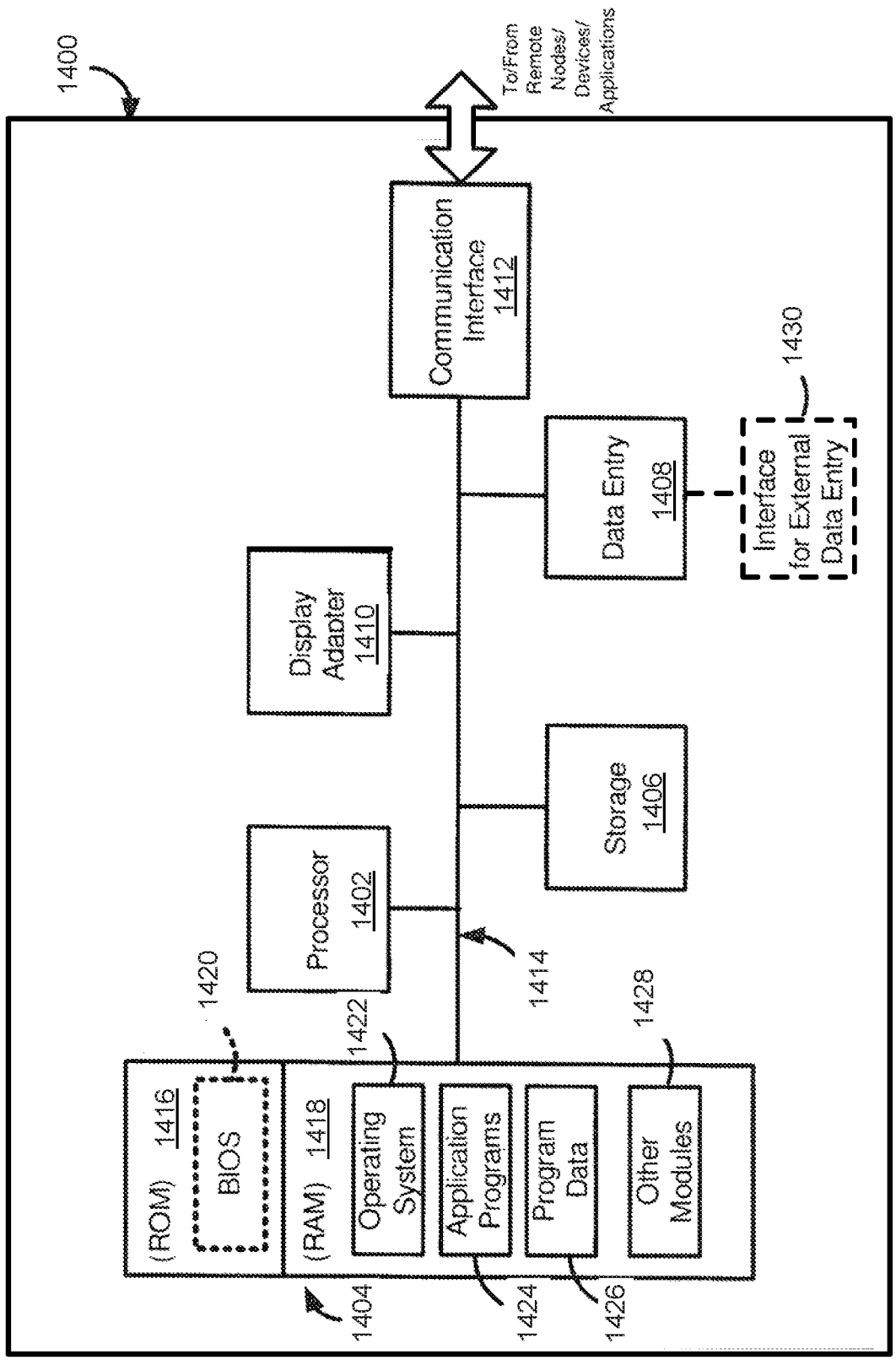
FIG. 14 depicts a block diagram illustrating an exemplary computing system for execution of the operations comprising various embodiments of the disclosure.

FIG. 14 depicts a diagram illustrating an exemplary computing system 1400 for execution of the operations comprising various embodiments of the disclosure. In some embodiments, the computing system 1400 may include a data analyzer, and data computation (and/or data source). As shown, the computing system 1400 for implementing the subject matter disclosed herein includes a hardware device 1400 including a processing unit 1402, memory 1404, storage 1406, data entry module 1408, display adapter 1410, communication interface 1412, and a bus 1414 that couples elements 1404-1412 to the processing unit 1402.

The bus 1414 may comprise any type of bus architecture. Examples include a memory bus, a peripheral bus, a local bus, etc. The processing unit 1402 is an instruction execution machine, apparatus, or device and may comprise a microprocessor, a digital signal processor, a graphics processing unit, an application specific integrated circuit (ASIC), a field programmable gate array (FPGA), etc. The processing unit 1402 may be configured to execute program instructions stored in memory 1404 and/or storage 1406 and/or received via data entry module 1408.

The memory 1404 may include read only memory (ROM) 1416 and random access memory (RAM) 1418. Memory 1404 may be configured to store program instructions and data during operation of device 1400. In various embodiments, memory 1404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 1404 may also include nonvolatile memory technologies such as nonvolatile flash RAM (NVRAM) or ROM. In some embodiments, it is contemplated that memory 1404 may include a combination of technologies such as the foregoing, as well as other technologies not specifically mentioned. When the subject matter is implemented in a computer system, a basic input/output system (BIOS) 1420, containing the basic routines that help to transfer information between elements within the computer system, such as during start-up, is stored in ROM 1416.

The storage 1406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1406, ROM 1416, or RAM 1418, including an operating system 1422, one or more applications programs 1424, program data 1426, and other program modules 1428. A user may enter commands and information into the hardware device 1400 through data entry module 1408. Data entry module 1408 may include mechanisms such as a keyboard, a touch screen, a pointing device, etc. Other external input devices (not shown) are connected to the hardware device 1400 via external data entry interface 1430. By way of example and not limitation, external input devices may include a microphone, joystick, game pad, satellite dish, scanner, or the like. In some embodiments, external input devices may include video or audio input devices such as a video camera, a still camera, etc. Data entry module 1408 may be configured to receive input from one or more users of device 1400 and to deliver such input to processing unit 1402 and/or memory 1404 via bus 1414.

A display may also be connected to the bus 1414 via display adapter 1410. In some embodiments, a given device such as a touch screen, for example, may function as both data entry module 1408 and display. External display devices may also be connected to the bus 1414 via external display interface. Other peripheral output devices, not shown, such as speakers and printers, may be connected to the hardware device 1400.

The hardware device 1400 may operate in a networked environment using logical connections to one or more remote nodes (not shown) via communication interface 1412. The remote node may be another computer, a server, a router, a peer device or other common network node, and typically includes many or all of the elements described above relative to the hardware device 1400. The communication interface 1412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 1412 may include logic configured to support direct memory access (DMA) transfers between memory 1404 and other devices.

In a networked environment, program modules depicted relative to the hardware device 1400, or portions thereof, may be stored in a remote storage device, such as, for example, on a server. It will be appreciated that other hardware and/or software to establish a communications link between the hardware device 1400 and other devices may be used.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The illustrated and described method elements are not necessarily strictly independent or unitary method steps. One or more of the illustrated elements (steps) may be combined with one or more of the other elements. Likewise, one or more of the illustrated method elements may be separated into one or more constituent sub-elements or sub-steps. These steps and sub-steps may be performed by the same or different hardware components and software processes, such as those shown in FIG. 14. At least one component defined by the claims may be implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more."

Furthermore, terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method to automatically classify documents, the method comprising:
    generating, by a system that includes a processor and memory, a plurality of entity data objects, each of the plurality of entity data objects representing a single person identified in a plurality of documents such that each entity data object of the plurality of entity data objects represents a different one of the persons identified in the plurality of documents and each entity data object of the plurality of entity data objects includes a name;
    after generating the plurality of entity data objects, creating, for at least one entity data object of the plurality of entity data objects, using a name in the at least one entity data object a plurality of name variants for the name, the plurality of name variants stored as data of the at least one entity data object;
    extracting, by the system, tokens from the plurality of documents, each token being a word or phrase from the plurality of documents;
    after extracting the tokens and creating the plurality of name variants, searching the tokens from the plurality of documents for matches with the data of the plurality of entity data objects, including the plurality of name variants;
    after searching the tokens, selecting, by the system, a first document of the plurality of documents in response to the first document including an extracted token that corresponds with data from two or more of the entity data objects of the plurality of entity data objects;
    identifying the two or more of the entity data objects as candidate entity data objects;
    determining, by the system, a particular entity data object of the candidate entity data objects to which the first document corresponds, wherein the determining comprises:
        calculating, for each of the candidate entity data objects using a document network graph, a degree of separation between the candidate entity data objects and one or more persons identified in the first document, the document network graph constructed to represent patterns between the persons identified in the plurality of documents; and
        selecting, as the particular entity data object, a candidate entity data object that includes the lowest degree of separation from the persons identified in the first document; and
    automatically assigning, by the system, the first document to a category corresponding to the particular entity data object.

2. The method of claim 1, wherein:
    the plurality of name variants are stored in name variant tables associated with each of the plurality of entity data objects, and
    the searching the tokens including searching based on the name variant tables in descending order of number of tokens in the name variants.

3. The method of claim 1, further comprising categorizing, by the system, the plurality of entity data objects into two or more categories using a machine learning model.

4. The method of claim 3, further comprising determining, by the system, feature vectors for each of the plurality of entity data objects based on the extracted tokens from the documents associated with each of the plurality of entity data objects, wherein the machine learning model categories the plurality of entity data objects using the feature vectors.

5. The method of claim 1, wherein the plurality of documents are emails and the persons identified in the plurality of documents are persons identified in receiver and sender fields of the emails.

6. The method of claim 5, wherein the determining the particular entity data object further comprises:
    in response to multiple candidate entity data objects including the lowest degree of separation, calculating an email volume of each of the multiple candidate entity data objects, wherein the email volume is a number of emails sent from persons of the multiple candidate entity data object to each person identified in the receiver and sender fields of the first document; and selecting the particular entity data object from the multiple candidate entity data objects based on the particular entity data object including the highest volume.

7. The method of claim 5, wherein generating the plurality of entity data objects comprises:

generating, by the system, a plurality of initial entity data objects using the persons identified in receiver and sender fields of the emails; and merging two or more of the plurality of initial entity data objects to form an entity data object, wherein the merging comprises:

determining whether an initial entity data object is similar to a first entity data object of the plurality of initial entity data objects;

identifying second entity data objects of the plurality of initial entity data objects that relate to the first entity data object based on the second entity data objects including a name that is included in the first entity data object or a variant of a name included in the first entity data object; and merging the initial entity data object into the first entity data object in response to all of the second entity data objects being domain compatible with the first entity data object.

8. The method of claim 7, wherein generating the plurality of entity data objects comprises:

identifying a level set for each initial entity data object based on a number of tokens in the initial entity data object associated with names; and performing the merging of the initial entity data objects by level set in descending order of number of tokens.

9. The method of claim 5, further comprising:

classifying one or more the emails as spam emails; and removing entity data objects from the plurality of entity data objects that are senders of the spam emails.

10. The method of claim 5, further comprising:

identifying disclaimers in the emails, wherein searching the extracted tokens does not comprise searching tokens from the disclaimers in the emails.

11. The method of claim 10, wherein identifying disclaimers further comprises marking a set of paragraphs in the emails as disclaimers and using the set of disclaimer paragraphs to calculate a coverage score to identify additional disclaimers in the emails.

12. One or more non-transitory computer-readable media comprising computer-readable instructions that, when executed by one or more processors, cause the one or more processors to perform operations, the operations comprising:

generating a plurality of entity data objects, each of the plurality of entity data objects representing a single person identified in a plurality of documents such that each entity data object of the plurality of entity data objects represents a different one of the persons identified in the plurality of documents and each entity data object of the plurality of entity data objects includes a name;

after generating the plurality of entity data objects, creating, for at least one entity data object of the plurality of entity data objects, using a name in the at least one entity data object a plurality of name variants for the name, the plurality of name variants stored as data of the at least one entity data object;

extracting tokens from the plurality of documents, each token being a word or phrase from the plurality of documents;

after extracting the tokens and creating the plurality of name variants, searching the tokens from the plurality of documents for matches with the data of the plurality of entity data objects, including the name variants;

after searching the tokens, selecting a first document of the plurality of documents in response to the first document including an extracted token that corresponds with data from two or more of the entity data objects of the plurality of entity data objects;

identifying the two or more of the entity data objects as candidate entity data objects;

determining a particular entity data object of the candidate entity data objects to which the first document corresponds, wherein the determining comprises:

calculating, for each of the candidate entity data objects using a document network graph, a degree of separation between the candidate entity data objects and one or more persons identified in the first document, the document network graph constructed to represent patterns between the persons identified in the plurality of documents; and selecting, as the particular entity data object, a candidate entity data object that includes the lowest degree of separation from the persons identified in the first document; and automatically assigning the first document to a category corresponding to the particular entity data object.

13. The one or more non-transitory computer-readable media of claim 12, wherein the plurality of documents are emails and the persons identified in the plurality of documents are persons identified in receiver and sender fields of the emails.

14. The one or more non-transitory computer-readable media of claim 13, wherein the operations further comprise:

classifying one or more the emails as spam emails; and removing entity data objects from the plurality of entity data objects that are senders of the spam emails.

15. The one or more non-transitory computer-readable media of claim 13, wherein the operations further comprise identifying disclaimers in the emails, wherein searching the extracted tokens does not comprise searching tokens from the disclaimers in the emails.

16. A system comprising:

one or more non-transitory computer-readable media including computer-readable instructions; and one or more processors coupled to the non-transitory computer-readable media and configured to execute the computer-readable instructions to cause or direct the system to perform operations, the operations comprising:

generating a plurality of entity data objects, each of the plurality of entity data objects representing a single person identified in a plurality of documents such that each entity data object of the plurality of entity data objects represents a different one of the persons identified in the plurality of documents and each entity data object of the plurality of entity data objects includes a name;

after generating the plurality of entity data objects, creating, for at least one entity data object of the plurality of entity data objects, using a name in the at least one entity data object a plurality of name variants for the name, the plurality of name variants stored as data of the at least one entity data object;

extracting tokens from the plurality of documents, each token being a word or phrase from the plurality of documents;

after extracting the tokens and creating the plurality of name variants, searching the tokens from the plurality of documents for matches with the data of the plurality of entity data objects, including the name variants;

after searching the tokens, selecting a first document of the plurality of documents in response to the first document including an extracted token that corresponds with data from two or more of the entity data objects of the plurality of entity data objects;

identifying the two or more of the entity data objects as candidate entity data objects;

determining a particular entity data object of the candidate entity data objects to which the first document corresponds, wherein the determining comprises:

calculating, for each of the candidate entity data objects using a document network graph, a degree of separation between the candidate entity data objects and one or more persons identified in the first document, the document network graph constructed to represent patterns between the persons identified in the plurality of documents; and selecting, as the particular entity data object, a candidate entity data object that includes the lowest degree of separation from the persons identified in the first document; and automatically assigning the first document to a category corresponding to the particular entity data object.

17. The system of claim 16, wherein the plurality of documents are emails and the persons identified in the plurality of documents are persons identified in receiver and sender fields of the emails.

18. The system of claim 17, wherein the operations further comprise:

classifying one or more the emails as spam emails; and removing entity data objects from the plurality of entity data objects that are senders of the spam emails.

19. The system of claim 17, wherein the operations further comprise identifying disclaimers in the emails, wherein searching the extracted tokens does not comprise searching tokens from the disclaimers in the emails.

* * * * *